United States Patent
Hatada et al.

(10) Patent No.: US 8,317,913 B2
(45) Date of Patent: Nov. 27, 2012

(54) INKJET INK, AND INK CARTRIDGE, INKJET RECORDING METHOD, INKJET RECORDING APPARATUS AND INK RECORD USING THE SAME

(75) Inventors: Shigeo Hatada, Numazu (JP); Keishi Taniguchi, Susono (JP); Shigeru Kusakata, Susono (JP); Ichiroh Fujii, Atsugi (JP); Akihiko Matsuyama, Isehara (JP); Yuuki Yokohama, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 1141 days.

(21) Appl. No.: 12/190,946

(22) Filed: Aug. 13, 2008

(65) Prior Publication Data

US 2009/0047431 A1    Feb. 19, 2009

(30) Foreign Application Priority Data

Aug. 14, 2007 (JP) .................. 2007-211470
Jul. 30, 2008 (JP) .................. 2008-196734

(51) Int. Cl.
*C09D 11/00* (2006.01)

(52) U.S. Cl. ............ 106/31.59; 347/100; 523/160; 427/466

(58) Field of Classification Search ............ 106/31.59, 106/31.89, 31.25; 347/100; 523/160, 161; 427/466–469

See application file for complete search history.

(56) References Cited

U.S. PATENT DOCUMENTS

| | | | |
|---|---|---|---|
| 6,814,792 B2 | 11/2004 | Taniguchi et al. | |
| 6,863,386 B2 | 3/2005 | Hatada et al. | |
| 6,881,251 B2 | 4/2005 | Taniguchi et al. | |
| 2001/0029273 A1 | 10/2001 | Taniguchi et al. | |
| 2003/0130377 A1 | 7/2003 | Taniguchi et al. | |
| 2005/0087105 A1 | 4/2005 | Taniguchi et al. | |
| 2006/0209149 A1 | 9/2006 | Hasegawa et al. | |
| 2006/0272543 A1 | 12/2006 | Hakiri et al. | |
| 2008/0036830 A1 | 2/2008 | Natori et al. | |
| 2008/0036840 A1 | 2/2008 | Hakiri et al. | |

FOREIGN PATENT DOCUMENTS

| | | | |
|---|---|---|---|
| EP | 0 580 283 A2 | | 1/1994 |
| EP | 0 606 490 A1 | | 7/1994 |
| EP | 1 754 759 A2 | | 2/2007 |
| EP | 1 811 002 A2 | | 7/2007 |
| JP | 61-59911 | | 3/1986 |
| JP | 2-51734 | | 2/1990 |
| JP | 6-71882 | | 3/1994 |
| JP | 2003-226827 | | 8/2003 |
| JP | 2004-10733 | | 1/2004 |
| JP | 2005-138383 | * | 6/2005 |
| JP | 3952794 | | 5/2007 |
| JP | 2007-154021 | | 6/2007 |
| JP | 2007-253616 | | 10/2007 |
| JP | 2008-95089 | | 4/2008 |
| WO | WO 2007/072951 A1 | | 6/2007 |

* cited by examiner

*Primary Examiner* — Necholus Ogden, Jr.
(74) *Attorney, Agent, or Firm* — Oblon, Spivak, McClelland, Maier & Neustadt, L.L.P.

(57) ABSTRACT

The present invention provides an inkjet ink containing at least a colorant, water, a water insoluble resin, a fluorine surfactant, and a polyether-modified silicone oil, wherein the polyether-modified silicone oil has a hydrophobic value of 0.40 to 1.5, and the hydrophobic value is expressed by Equation 1:

$$\text{Hydrophobic value} = A/B \qquad \text{Equation 1}$$

where "A" represents an integration value of a peak area from 0 ppm to 0.3 ppm in a $^1$H-NMR spectrum of the polyether-modified silicone oil using tetramethylsilane as a reference substance; and "B" represents an integration value of a peak area from 3.5 ppm to 4.0 ppm in the $^1$H-NMR spectrum.

6 Claims, 14 Drawing Sheets

INKJET INK, AND INK CARTRIDGE, INKJET RECORDING METHOD, INKJET RECORDING APPARATUS AND INK RECORD USING THE SAME

BACKGROUND OF THE INVENTION

1. Field of the Invention

The present invention relates to an inkjet ink suitably used for image recording by an inkjet method, and an ink cartridge, inkjet recording method, inkjet recording apparatus and ink record using the inkjet ink.

2. Description of the Related Art

Inkjet recording has advantages over other recording methods in that it facilitates full-colorization because of the process that is simpler than those of other recording methods and in that high-resolution images can be obtained even with a simply configured apparatus.

Recently, demands for image quality, color phase, color saturation, glossiness, and durability (scratch resistance, marker resistance and the like) become more exacting in association with technical improvement in OA printers for speed-up and higher image quality.

In order to accomplish high image quality using a regular paper, it is effective to decrease the surface tension of an ink and to increase wettability to the regular paper so as to increase color developing property. Furthermore, a water insoluble resin can be effectively added to an ink to improve image durability.

For example, Japanese Patent Application Laid-Open (JP-A) No. 2003-226827 discloses an ink containing polymer fine particles, a water insoluble or poorly-water soluble colorant, a water-soluble organic solvent and a fluorine surfactant. However, such an ink having a lower surface tension and containing a fluorine surfactant has a problem in that a nozzle plate is easily wet and discharge stability is hard to be ensured.

Additionally, JP-A No. 2004-10733 discloses an ink containing a water soluble solvent, a colorant, water and a polymer which contains at least an alkylene oxide moiety, aromatic ring moiety and carboxyl moiety in one molecule. JP-A No. 2004-10733 also discloses "liquid repellent treatment around a discharge port" and "an ink containing a silicone surfactant, a fluorine surfactant and the like". However, JP-A No. 2004-10733 does not disclose kinds of silicone surfactants, and the ink having a lower surface tension and containing a fluorine surfactant proposed in JP-A No. 2004-10733 is hard to ensure ink repellency.

JP-A 2007-154021 discloses aqueous dispersions for inkjet recording, which contains a self-dispersible pigment, polymer particles and a compound containing polysiloxane skeleton, and an aqueous ink containing the aqueous dispersions. However, the ink has a surface tension of 25 mN/m to 50 mN/m, which is not intended to obtain an ink having a lower surface tension, and a nozzle plate is not particularly treated.

Therefore, the inventors of the present invention proposed adding a silicone resin in an ink repellent layer of a nozzle plate in an inkjet nozzle so as to decrease a surface tension of an inkjet ink and increase wettability to a recording medium, thereby increasing color development property (JP-A No. 2005-138383). According to JP-A No. 2005-138383, the color developing property of ink can be improved, but ink is needed to be excellent not only in initial ink repellency but also in mechanical durability such as resistant to wiping because of speed-up and increase of frequency of usage of printers. When a conventional inkjet ink is used, initial ink repellency can be ensured, but a dried ink fixes to an ink repellent layer upon continuous printing, causing poor ink repellency.

JP-A No. 2008-95089 discloses an ink containing water, a water soluble organic solvent, a water dispersible resin, a pigment and any one of a fluorine surfactant and silicone surfactant as a surfactant, but fails to mention ink fixation to an ink repellent layer. Practically, the problem of the ink fixation to the ink repellent layer is not solved by the proposed formulation.

BRIEF SUMMARY OF THE INVENTION

An object of the present invention is to provide an inkjet ink capable of being prevented from fixation to an ink repellent layer and is excellent in discharge stability, and an ink cartridge, inkjet recording method, inkjet recording apparatus, and ink record using the inkjet ink.

The present invention is based on the aforementioned finding made by the inventors, and means for solving the above-described problems are described below.

<1> An inkjet ink containing at least a colorant, water, a water insoluble resin, a fluorine surfactant, and a polyether-modified silicone oil, wherein the polyether-modified silicone oil has a hydrophobic value of 0.40 to 1.5, and the hydrophobic value is expressed by Equation 1:

$$\text{Hydrophobic value} = A/B \qquad \text{Equation 1}$$

where "A" represents an integration value of a peak area from 0 ppm to 0.3 ppm in a $^1$H-NMR spectrum of the polyether-modified silicone oil using tetramethylsilane as a reference substance; and "B" represents an integration value of a peak area from 3.5 ppm to 4.0 ppm in the $^1$H-NMR spectrum.

<2> The inkjet ink according to <1>, wherein the colorant is a pigment dispersion in which a pigment is dispersed with any one of a nonionic surfactant and an anionic surfactant.

<3> The inkjet ink according to <2>, wherein the nonionic surfactant is at least one of compounds expressed by General Formula (1):

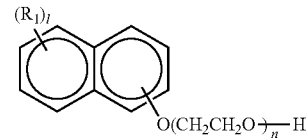

General Formula (1)

where $R_1$ represents an alkyl group having 1 to 20 carbon atoms, an aralkyl group or an allyl group, "l" is an integer of 0 to 7, and "n" is an integer of 20 to 200.

<4> The inkjet ink according to <1>, wherein the colorant is a self-dispersible pigment.

<5> The inkjet ink according to <1>, wherein the colorant is a dye.

<6> The inkjet ink according to any one of <1> to <5>, wherein the fluorine surfactant contains a compound expressed by General Formula (2):

$$CF_3CF_2(CF_2CF_2)_m\text{—}CH_2CH_2O(CH_2CH_2O)_nH \qquad \text{General Formula (2)}$$

where, "m" is an integer of 0 to 10, and "n" is an integer of 0 to 40.

<7> The inkjet ink according to any one of <1> to <5>, wherein the fluorine surfactant contains a compound expressed by General Formula (3):

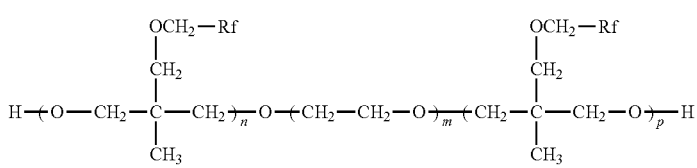

General Formula (3)

where, Rf represents a fluorine-containing group, and "m", "n" and "p" are respectively integers.

<8> The inkjet ink according to any one of <1> to <5>, wherein the fluorine surfactant contains a compound expressed by General Formula (4):

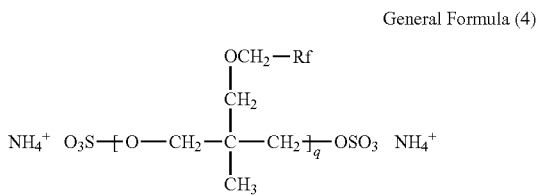

General Formula (4)

where Rf represents a fluorine-containing group, and "q" is an integer.

<9> The inkjet ink according to any one of <1> to <8>, wherein the water insoluble resin is a resin emulsion.

<10> The inkjet ink according to <9>, wherein the resin emulsion contains at least one selected from a polyurethane resin emulsion, styrene-acrylic resin emulsion, acryl-silicone resin emulsion and fluorine resin emulsion.

<11> The inkjet ink according to <10>, wherein the polyurethane resin emulsion is an anionic self-emulsifiable ether polyurethane resin emulsion.

<12> An inkjet recording method including jetting an inkjet ink from an inkjetting unit so as to record an image on a recording medium by applying a stimulus to the inkjet ink according to any one of <1> to <11>, wherein the inkjetting unit contains a recording head whose surface provided with an opening for ink discharge has an ink repellent layer.

<13> The inkjet recording method according to <12>, wherein the ink repellent layer is composed of any one of a fluorine material and silicone material.

<14> The inkjet recording method according to any one of <12> to 15<13>, wherein the ink repellent layer has a surface roughness Ra of 0.2 μm or less.

<15> The inkjet recording method according to any one of <12> to <14>, wherein the ink repellent layer is so formed that a cross section area in a plane perpendicular to a central line of an opening of the ink repellant layer, which is formed on the surface provided with the opening for ink discharge in the recording head, in the vicinity of the opening increases successively with distance from the surface of the base material.

<16> The inkjet recording method according to any one of <12> to <15>, wherein the ink repellent layer has a critical surface tension of 5 mN/m to 40 mN/m.

<17> An inkjet recording apparatus containing an inkjetting unit configured to jet an inkjet ink so as to record an image on a recording medium by applying a stimulus to the inkjet ink according to any one of <1> to <11>, wherein the stimulus is at least one selected from heat, pressure, vibration and light.

<18> An ink cartridge containing a container which contains the inkjet ink according to any one of <1> to <11>.

<19> An ink record containing an image recorded on a recording medium by using the inkjet ink according to any one of <1> to <11>.

An inkjet ink of the present invention contains at least a colorant, water, a water insoluble resin, a fluorine surfactant and a polyether-modified silicone oil, wherein the polyether-modified silicone oil has a hydrophobic value of 0.40 to 1.5 as measured using a $^1$H-NMR spectrum of the polyether-modified silicone oil using tetramethylsilane (TMS) as a reference substance, and the hydrophobic value is expressed by the above Equation 1.

Because a perfluoroalkyl group has oil repellency in the fluorine surfactant contained in the inkjet ink of the present invention, the ink containing the fluorine surfactant has excellent releasability to the ink repellent layer, in which lipophilic groups are attached to the surface thereof. Thus, it is considered that the ink fixation to the ink repellent layer containing a silicone resin is caused due to drying of the colorant and water insoluble resin in the ink.

Therefore, the hydrophilic-lipophilic balance of the polyether-modified silicone oil which is added to the ink is focused on and studied, and it is found that, particularly, a hydrophobic value correlates with ink fixation to an ink repellent layer, and that the ink fixation to the ink repellent layer can be prevented by adjusting the hydrophobic value of the polyether-modified silicone oil to 0.40 to 1.5. Generally, hydrophilic-lipophilic balance is discussed in terms of an HLB value, however, the ink fixation to an ink repellent layer is not correlated with an HLB value, and cannot be explained only in terms of an HLB value (see Table 6). When the hydrophobic value is 0.40 to 1.5, the proportion of hydrophobic sites in the silicone oil is increased, allowing the silicone oil to be easily adsorbed on a water insoluble resin. Thus, hydrophilization of the surface of the water insoluble resin prevents the ink from fixation to an ink repellent layer, thereby improving discharge stability. When the hydrophobic value is less than 0.40, the silicone oil is not sufficiently adsorbed on a water insoluble resin, thereby causing ink fixation to the ink repellent layer. When the hydrophobic value is more than 1.5, the proportion of hydrophilic sites is relatively decreased, thus a surface of the water insoluble resin is not sufficiently hydrophilized, and does not exhibit the effect of preventing the ink from fixation.

An inkjet recording apparatus of the present invention contains at least an inkjetting unit configured to jet the inkjet ink of the present invention so as to record an image on a recording medium by applying stimulus (energy) to the inkjet ink, and the stimulus is at least one selected from heat, pressure, vibration and light. In the inkjet recording apparatus, the inkjetting unit applies energy to the inkjet ink of the present invention so as to jet the inkjet ink for recording an image, thereby obtaining discharge stability and high quality images.

An inkjet recording method of the present invention is an inkjet recording method including jetting an inkjet ink from an inkjetting unit so as to record an image on a recording medium by applying a stimulus to the inkjet ink according to any one of <1> to <11>, wherein inkjetting unit contains a recording head whose surface provided with an opening for ink discharge has an ink repellent layer, thereby obtaining discharge stability and high quality images.

The ink cartridge used in the present invention contains a container which contains the inkjet ink of the present invention. The ink cartridge is suitably used for a printer and the like using the inkjet recording method. Recording is performed using the inkjet ink contained in the ink cartridge, thereby obtaining discharge stability and high quality images.

The ink record according to the present invention contains an image recorded on a recording medium by using the inkjet ink of the present invention. The ink record according to the present invention can maintain high quality images having excellent color tone on various recording media.

Figure 1:
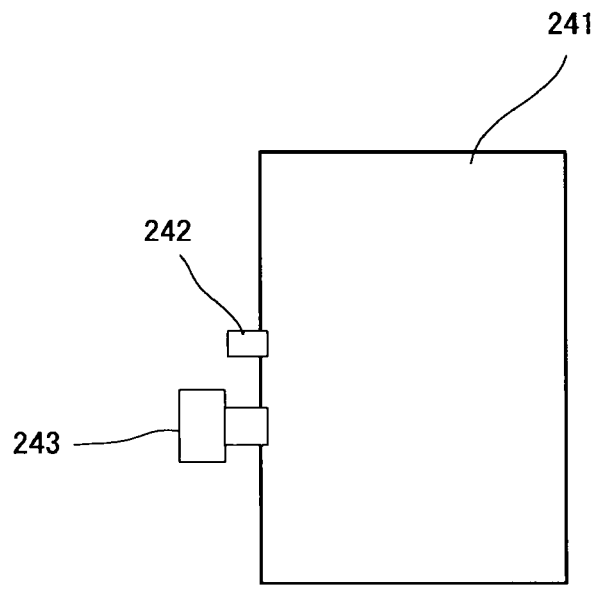
FIG. 1 shows a schematic view of an example of an ink cartridge used in the present invention.

DETAILED DESCRIPTION OF THE INVENTION (Inkjet Ink)

The inkjet ink of the present invention contains at least a colorant, water, water insoluble resin, fluorine surfactant and polyether-modified silicone oil, and contains a water-soluble organic solvent and penetrating agent, and further contains other components as necessary.

The inkjet ink is used for an inkjet recording apparatus containing at least an inkjet head having an ink repellent layer as described later, and can be prevented from fixation to a nozzle plate having the ink repellent layer, and has a property excellent discharge stability.

-Polyether-Modified Silicone Oil-

A polyether-modified silicone oil, which is contained in the inkjet ink, has a hydrophobic value of 0.40 to 1.5. The hydrophobic value is expressed by Equation 1:

$$\text{Hydrophobic value} = A/B \qquad \text{Equation 1}$$

where "A" represents an integration value of a peak area from 0 ppm to 0.3 ppm in a $^1\text{H-NMR}$ spectrum of the polyether-modified silicone oil using tetramethylsilane (TMS) as a reference substance; and "B" represents an integration value of a peak area from 3.5 ppm to 4.0 ppm in the $^1\text{H-NMR}$ spectrum.

Here, in the $^1\text{H-NMR}$ spectrum the integration value of a peak area from 3.5 ppm to 4.0 ppm corresponds to the number of hydrogen atoms of a hydrophilic site such as polyoxyethylene, polyoxypropylene or the like in the polyether-modified silicone oil, and the integration value of a peak area from 0 ppm to 0.3 ppm corresponds to the number of hydrogen atoms of an alkyl group (hydrophobic site) bonded to Si element in the polyether-modified silicone oil. When the hydrophobic value, which is the ratio of the integration value of a peak area from 0 ppm to 0.3 ppm to the integration value of a peak area from 3.5 ppm to 4.0 ppm, is adjusted to 0.40 or more, the proportion of the hydrophobic sites in the silicone oil is increased. As a result, the silicone oil tends to be absorbed in the water insoluble resin, and thus the surface of the water insoluble resin is hydrophilized so as to be prevented from fixation to the ink repellent layer which has a hydrophobic surface.

Note that the integration value does not include the integration values of peak areas in the spectra of tetramethylsilane (TMS) as a reference substance and spinning sideband of TMS.

The hydrophobic value expressed by Equation 1 is preferably 0.40 to 1.5, and more preferably 0.40 to 1.2. When the hydrophobic value is less than 0.40, the silicone oil is not sufficiently adsorbed on a water insoluble resin, thereby causing ink fixation. On the other hand, when the hydrophobic value is more than 1.5, the proportion of hydrophilic sites is relatively decreased, thus a surface of the water insoluble resin is not sufficiently hydrophilized, and does not exhibit the effect of preventing the ink from fixation.

Here, the $^1$H-NMR spectrum measurement is conducted using "JEOL JNM-A400FT NMR SYSTEM" (manufactured by JEOL Ltd.) under the following conditions: sample concentration=1% by mass; solvent: deuterated chloroform ($CDCl_3$); the number of integration=128; and temperature: room temperature. When the sample does not have sufficient solubility, solvents such as DMSO, DMF-d7, THF-d8, acetone-d6, methanol-d4, heavy water and hexane-d14 may be used in this order. The solvent which firstly dissolves the sample is used. The hydrophobic value is indicated by rounding off a measured value to two decimal places.

Such a polyether-modified silicone oil has a polyoxyalkylene group, which is an adduct of ethylene oxide and propylene oxide, at a side chain of dimethyl polysiloxane, and commercially available one can be used. Examples of the commercially available polyether-modified silicone oils include DOW CORNING TORAY L-7604 (by Dow Corning Toray Co., Ltd.), and KF-353 (by Shin-Etsu Chemical Co., Ltd.).

The amount of the polyether-modified silicone oil in the inkjet ink is preferably 0.05% by mass to 3% by mass, and more preferably 0.1% by mass to 2% by mass.

-Colorant-

As a colorant, any one of (1) a pigment dispersion obtained by dispersing a pigment with a nonionic surfactant, (2) a self-dispersible pigment, and (3) a dye can be suitably used.

The ink containing one of these colorants (1) to (3) and a water insoluble resin usually fixes on the ink repellent layer containing a silicone resin, but, as described above, a certain polyether-modified silicone oil is contained in the ink so as to prevent the ink from fixation.

(1) Pigment Dispersion Obtained by Dispersing Pigment with Nonionic Surfactant

The pigment is not particularly limited and may be appropriately selected according to the purpose. For example, either an inorganic pigment or organic pigment may be used.

Examples of the organic pigments include azo pigments, phthalocyanine pigments, anthraquinone pigments, dioxazine pigments, indigo pigments, thioindigo pigments, perylene pigments, isoindolinone pigments, aniline black pigments, azomethine pigments and rhodamine B lake pigments.

Examples of the inorganic pigments include carbon blacks, iron oxides, titanium oxides, calcium carbonate, barium sulfate, aluminum hydroxide, barium yellow, iron blue, cadmium red, chrome yellow and metal particles.

The color of the pigment is not particularly limited and may be appropriately selected according to the purpose. For example, black pigments and color pigments can be used. These pigments may be used alone or in combination.

Examples of black pigments include carbon blacks (C.I. Pigment Black 7) such as furnace black, lamp black, acetylene black, and channel black, metals such as copper oxides, iron oxides, (C.I. Pigment Black 11), and titanium oxides, and organic pigments such as aniline black (C.I. Pigment Black 1).

Examples of color pigments, specifically, for yellow ink include C.I. Pigment Yellow 1 (Fast Yellow G), 2, 3, 12 (Disazo Yellow AAA), 13, 14, 16, 17, 20, 23, 24, 34, 35, 37, 42 (yellow iron oxide), 53, 55, 73, 74, 75, 81, 83 (Disazo Yellow HR), 86, 93, 95, 97, 98, 100, 101, 104, 108, 109, 110, 114, 117, 120, 125, 128, 129, 137, 138, 139, 147, 148, 150, 151, 153, 154, 155, 166, 168, 180, 185.

Examples of pigments for magenta ink include C.I. Pigment Red 1, 2, 3, 5, 7, 9, 12, 17, 22 (Brilliant Fast Scarlet), 23, 31, 38, 48:1 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 92, 97, 101 (iron oxide red), 104, 105, 106, 108 (cadmium red), 112, 114, 122 (dimethylquinacridone), 123, 146, 149, 166, 168, 170, 172, 175, 176, 178, 179, 180, 184, 185, 190, 192, 193, 202, 209, 215, 216, 217, 219, 220, 223, 226, 227, 228, 238, 240, 254, 255, 272.

Examples of pigments for cyan ink include C.I. Pigment Blue 1, 2, 3, 15 (Copper Phthalocyanine Blue R), 15:1, 15:2, 15:3 (Phthalocyanine Blue G), 15:4, 15:6 (Phthalocyanine Blue E), 16, 17:1, 22, 56, 60, 63, 64, Vat Blue 4, and Vat Blue 60.

Examples of pigments for intermediate colors, i.e, red, green, and blue, include C.I. Pigment Red 177, 194, 224, C.I. Pigment Orange 16, 36, 43, 51, 55, 59, 61, 71, C.I. Pigment Violet 3, 19, 23, 29, 30, 37, 40, 50 and C.I. Pigment Green 7, 36.

As a black pigment, a carbon black is preferably used. A preferred carbon black is produced by a furnace method and a channel method, and has a primary particle diameter of 15 nm to 40 nm, a specific surface area determined by a BET method of 50 $m^2/g$ to 300 $m^2/g$, a DBP oil adsorption quantity of 4 mL/100 g to 150 mL/100 g, a volatile fraction of 0.5% to 10%, and a pH value of 2 to 9.

An acidic carbon black having pH of 6 or less is particularly preferable because of high concentration.

As color pigments, C.I. Pigment Yellow 13, 17, 55, 74, 93, 97, 98, 110, 128, 139, 147, 150, 151, 154, 155, 180, 185; C.I. Pigment Red 122, 202, 209; C.I. Pigment Blue 15:3, 15:4 are particularly preferable.

The average particle diameter of the pigment is not particularly limited and may be appropriately selected according to the purpose. It is preferably 10 nm to 150 nm, more preferably 20 nm to 100 nm, and still more preferably 30 nm to 80 nm. When the average particle diameter is more than 150 nm, the color saturation of a printed image may be decreased, and additionally, thickening and aggregation during ink storage and nozzle clogging during printing may easily occur. On the other hand, when the average particle diameter of the pigment is less than 10 nm, light resistance is decreased and storage stability tends to be poor.

The average particle diameter of the pigment means an average particle diameter (D50) measured on a sample which is diluted with pure water to a pigment concentration (mass concentration) of 0.01% by mass, using MICROTRAC UPA-150 (manufactured by NIKKISO CO., LTD.) at 23° C. under the conditions of a particle refractive index of 1.51, a particle density of 1.4 $g/cm^3$ and a pure water parameter as a solvent parameter.

The pigment is dispersed with a nonionic surfactant so as to decrease the particle diameter and particle distribution width of the pigment, and the amount of coarse particles of the pigment in the ink fixing to a nozzle plate is decreased so as to decrease damages to the ink repellent layer caused by friction of coarse particles in the ink during wiping, and thus the ink less fixes to the nozzle plate.

The nonionic surfactant is not particularly limited and may be appropriately selected according to the kinds of pigments. Examples thereof include polyoxyethylene alkylether such as polyoxyethylene lauryl ether, polyoxyethylene myristyl ether, polyoxyethylene cetyl ether, polyoxyethylene stearyl ether, polyoxyethylene oleyl ether; polyoxyethylene alkylphenyl ether such as polyoxyethylene octylphenyl ether, polyoxyethylene nonylphenyl ether; polyoxyethylene α-naphthylether, polyoxyethylene β-naphthylether, polyoxyethylene monostyryl phenyl ether, polyoxyethylene distyryl phenyl ether, polyoxyethylene alkyl naphthyl ether, polyoxyethylene monostyryl naphthyl ether, polyoxyethylene distyryl naphthyl ether, and a polyoxyethylene-polyoxypropylene block copolymer. Moreover, examples thereof further include surfactants in which a part of polyoxyethylene of the nonionic surfactant listed above is substituted with polyoxypropylene, and compounds prepared by condensing aromatic ring-containing compounds with formalin such as polyoxyethylene alkyl phenyl ether.

Hydrophilic lipophilic balance (HLB) of the nonionic surfactant is preferably 12 to 19.5, and more preferably 13 to 19. When HLB is less than 12, the surfactant is not uniformly dispersed in a dispersion medium, adversely affecting dispersion stability. When HLB is more than 19.5, the dispersant less adheres to the pigment, adversely affecting dispersion stability.

As the nonionic surfactant, a compound expressed by General Formula (1) is particularly preferably used. By dispersing a pigment with this compound, the average particle diameter of the pigment becomes smaller and the particle distribution can be narrowed.

General Formula (1)

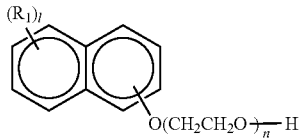

where $R_1$ represents an alkyl group having 1 to 20 carbon atoms, an allyl group or an aralkyl group, "l" is an integer of 0 to 7, and "n" is an integer of 20 to 200.

In $R_1$, examples of alkyl groups having 1 to 20 carbon atoms include methyl, ethyl, n-propyl, i-propyl, butyl (n-butyl, i-butyl, t-butyl, sec-butyl); pentyl (n-pentyl, i-pentyl, neopentyl, cyclopentyl, etc.); hexyl (n-hexyl, i-hexyl, cyclohexyl, etc.); heptyl (n-heptyl, i-heptyl, etc.); octyl (n-octyl, i-octyl, t-octyl, etc.); nonyl (n-nonyl, i-nonyl, etc.); decyl (n-decyl, i-decyl, etc.); undecyl (n-undecyl, i-undecyl, etc.); dodecyl (n-dodecyl, i-dodecyl, etc.); and cyclopropyl, cyclobutyl, cyclopentyl, cyclohexyl, cycloheptyl, and cyclooctyl.

Examples of aralkyl groups include benzyl, phenethyl, 2-methylbenzyl, 3-methylbenzyl, and 4-methylbenzyl.

In General Formula (1), "n" is preferably an integer of 20 to 200, and more preferably an integer of 25 to 60. When "n" is an integer of less than 20, the dispersion stability is decreased, and the pigment may have a larger average particle diameter, and thus the color saturation tends to be poor. On the other hand, when "n" is an integer of more than 200, an ink may have high viscosity, and it tends to be difficult to carry out printing by an inkjet method.

The hydrophilic group of the nonionic surfactant is preferably a polyoxyethylene group. The reason is not clearly known, however, the hydrophilic group is preferably a polyoxyethylene group in that it can properly keep charge held on pigment particle surfaces and can reduce foamability of the ink.

Examples of the nonionic surfactants expressed by General Formula (1) include polyoxyethylene (n=7) octyl ether, polyoxyethylene (n=20) β-naphthyl ether, polyoxyethylene (n=40) β-naphthyl ether, and polyoxyethylene (n=60) β-naphthyl ether. Of these, polyoxyethylene (n=40) β-naphthyl ether is particularly preferable.

As a dispersant an anionic surfactant is also preferably used. Examples of anionic surfactants include a polyoxyethylene alkylether sulfate, polyoxyethylene alkylphenylether sulfate, polyoxyethylene monostyryl phenyl ether sulfate, polyoxyethylene distyryl phenyl ether sulfate, polyoxyethylene alkyl ether phosphate, polyoxyethylene alkylphenylether phosphate, polyoxyethylene monostyryl phenyl ether phosphate, polyoxyethylene distyryl phenyl ether phosphate, polyoxyethylene alkyl ether carboxylate, polyoxyethylene alkylphenylether carboxylate, polyoxyethylene monostyrylphenyl ether carboxylate, polyoxyethylene distyryl phenyl ether carboxylate, naphthalenesulfonate-formalin condensates, melaminesulfonate-formalin condensates, dialkyl sulfosuccinate, alkyl disulfosuccinate, polyoxyethylene alkyl disulfosuccinate, alkylsulfo acetate, α-olefin sulfonate, alkyl benzene sulfonate, alkyl naphthalene sulfonate, alkyl sulfonate, N-acyl amino acid salt, acyl peptide and soap. Of these, sulfates or phosphates of polyoxyethylene alkylether, polyoxyethylene alkylphenylether, and polyoxyethylene distyryl phenylether are particularly preferable.

The pigment dispersion can be prepared by mixing water, a pigment and an anionic surfactant or nonionic surfactant as a dispersant, and dispersing them with a sand mill, a homogenizer, a ball mill, a paint shaker, an ultrasonic dispersing machine or the like.

(2) Self-dispersible Pigment

A self-dispersible pigment means a pigment in which at least one hydrophilic group is bonded directly or via another atomic group to the pigment surface, and which can be dispersed with stability, without using a dispersant.

A hydrophilic group having ionicity is preferably used and anionic and cationic ones are particularly preferred.

Examples of anionic hydrophilic groups include —COOM, —SO$_3$M, —PO$_3$HM, —PO$_3$M$_2$, —SO$_2$NH$_2$, —SO$_2$NHCOR (where M represents a hydrogen atom, an alkali metal, ammonium, or an organic ammonium; R represents an alkyl group having 1 to 12 carbon atoms, an optionally substituted phenyl group or optionally substituted naphthyl group). In the present invention, colorants in which —COOM and —SO$_3$M are bonded to a pigment surface are preferably used. Examples of methods for obtaining anionically charged pigments include a method for oxidizing a pigment with sodium hypochlorite, a sulfonation method, and a method of causing a reaction with a diazonium salt.

Examples of the alkali metal represented by "M" in the hydrophilic group include lithium, sodium, and potassium. Examples of the organic ammoniums include mono- to tri-methylammonium, mono- to tri-ethylammonium, and mono- to tri-methanolammonium. Examples of methods for obtaining anionically charged pigments include methods by which —COONa is introduced to the pigment surface, such as a method for oxidizing a pigment with sodium hypochlorite, a sulfonation method, and a method of causing a reaction with a diazonium salt.

Quaternary ammonium groups are preferred as the aforementioned cationic hydrophilic groups bonded to a pigment surface. A pigment in which at least one of the below-described quaternary ammonium groups is bonded to the pigment surface is more preferably used.

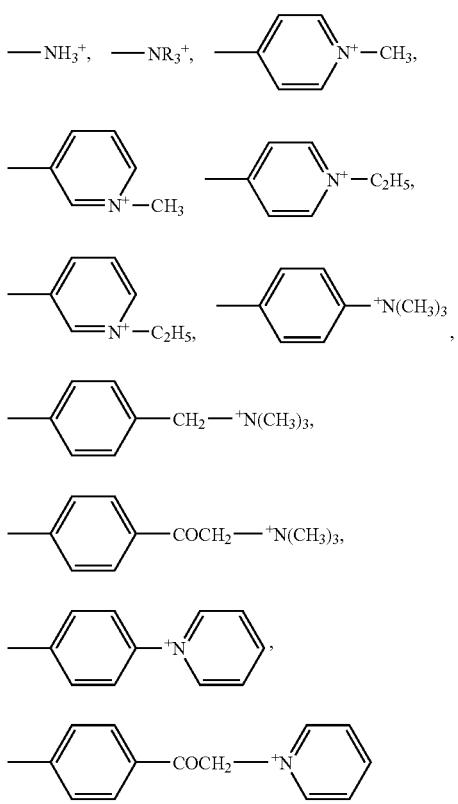

The hydrophilic group may be bonded to the pigment surface via another atomic group. Examples of other atomic groups include an alkyl group having 1 to 12 carbon atoms, an optionally substituted phenyl group or optionally substituted naphthyl group. Specific examples representing the case in which the aforementioned hydrophilic group is bonded to the pigment surface via another atomic group include —$C_2H_4COOM$ (where M represents an alkyl metal or quaternary ammonium), -$PhSO_3M$ (where Ph represents a phenyl group and M represents an alkali metal or quaternary ammonium), and —$C_5H_{10}NH_3+$.

The pigment base, before introducing the hydrophilic group, is not particularly limited and may be appropriately selected from the same as those described in the (1) pigment dispersion according to the purpose. A self-dispersible carbon black is particularly preferred.

(3) Dyes

When a dye is used as a colorant, an ink excellent in color tone can be obtained. Examples of dyes include water-soluble dyes, oil-soluble dyes, and dispersible dyes.

Water-soluble dyes are classified based on the color index thereof into acidic dyes, direct dyes, basic dyes, reactive dyes and food dyes, and it is preferred that dyes having high resistance to water and light be used.

Examples of acidic dyes and food dyes include C.I. Acid Yellow 17, 23, 42, 44, 79, 142; C.I. Acid Red 1, 8, 13, 14, 18, 26, 27, 35, 37, 42, 52, 82, 87, 89, 92, 97, 106, 111, 114, 115, 134, 186, 249, 254, 289; C.I. Acid Blue 9, 29, 45, 92, 249; C.I. Acid Black 1, 2, 7, 24, 26, 94; C.I. Food Yellow 3, 4; C.I. Food Red 7, 9, 14; and C.I. Food Black 1, 2.

Examples of direct dyes include C.I. Direct Yellow 1, 12, 24, 26, 33, 44, 50, 86, 120, 132, 142, 144; C.I. Direct Red 1, 4, 9, 13, 17, 20, 28, 31, 39, 80, 81, 83, 89, 225, 227; C.I. Direct Orange 26, 29, 62, 102; C.I. Direct Blue 1, 2, 6, 15, 22, 25, 71, 76, 79, 86, 87, 90, 98, 163, 165, 199, 202; and C.I. Direct Black 19, 22, 32, 38, 51, 56, 71, 74, 75, 77, 154, 168, 171.

Examples of basic dyes include C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C.I. Basic Black 2, 8.

Examples of reactive dyes include C.I. Reactive Black 3, 4, 7, 11, 12, 17; C.I. Reactive Yellow 1, 5, 11, 13, 14, 20, 21, 22, 25, 40, 47, 51, 55, 65, 67; C.I. Reactive Red 1, 14, 17, 25, 26, 32, 37, 44, 46, 55, 60, 66, 74, 79, 96, 97; and C.I. Reactive Blue 1, 2, 7, 14, 15, 23, 32, 35, 38, 41, 63, 80, 95.

The amount of the colorant in the inkjet ink is preferably 1% by mass to 15% by mass, more preferably 2% by mass to 12% by mass, and still more preferably 3% by mass to 10% by mass. When the amount of the colorant is less than 1% by mass, coloring power is not sufficient, and an image tends to be inferior in brightness. When the amount of the colorant is more than 15% by mass, the storage stability of ink is decreased and a dull image is obtained.

-Fluorine Surfactant-

By containing a fluorine surfactant in the ink, the wettability of the ink to paper can be improved without impairing the stability of pigment fine particles or dyes. With the improvement in the wettability of the ink to paper, a highly color-developed image with less ink bleed can be obtained.

The fluorine surfactant is not particularly limited and may be appropriately selected according to the purpose. Examples thereof include a perfluoroalkyl sulfonate, perfluoroalkyl carboxylate, perfluoroalkyl phosphate, perfluoroalkyl ethylene oxide adducts, perfluoroalkyl betaine, and perfluoroalkyl amine oxide compounds. Of these, the compounds represented by General Formulas (2), (3) or (4) are particularly preferable in terms of reliability.

$$CF_3CF_2(CF_2CF_2)_m\text{—}CH_2CH_2O(CH_2CH_2O)_nH \quad \text{General Formula (2)}$$

where, "m" is an integer of 0 to 10, and "n" is an integer of 0 to 40.

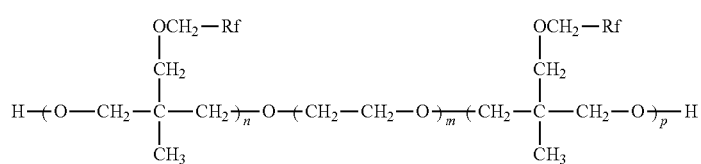

General Formula (3)

where, Rf represents a fluorine-containing group, for example, $CF_3$, $CF_2CF_3$ etc.; "m", "n" and "p" are respectively integers, "m" is an integer of 6 to 25, "n" is an integer of 1 to 4, and "p" is an integer of 1 to 4.

General Formula (4)

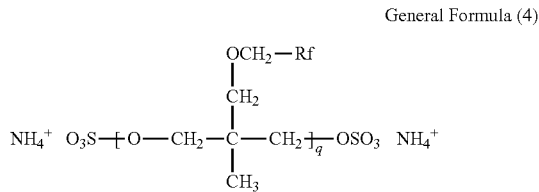

where Rf represents a fluorine-containing group, and "q" is an integer.

A fluorine surfactant is not particularly limited and may be appropriately selected according to the purpose, and suitably synthesized one or a commercially available product may be used.

Examples thereof include S-144 and S-145 (manufactured by Asahi Glass Co.); FC-170C, FC-430, and FRORARD FC4430 (manufactured by Sumitomo 3M Ltd.); FSO, FSO-100, FSN, FSN-100, and FS-300 (manufactured by DuPont); FT-250 and FT-251 (manufactured by Neos Co.); and PF-151N, PF-136A, PF-156A (manufactured by OMNOVA Solutions Inc.) Of these, FSO, FSO-100, FSN, FSN-100, and FS-300 (manufactured by DuPont) are preferable in that they provide excellent printing quality and storage stability. These nonionic fluorine surfactants may be used alone or in combination.

The amount of the fluorine surfactant added in the ink is preferably 0.1% by mass to 10% by mass, and more preferably 0.1% by mass to 5% by mass. When the amount of the fluorine surfactant is less than 0.1% by mass, a remarkable effect of enhancement in permeability cannot be obtained. When the amount is more than 10% by mass, the viscosity of the ink is increased to cause aggregation of the ink upon storing under a high-temperature condition, adversely affecting the reliability of the ink.

-Water Insoluble Resin-

As a water insoluble resin, a resin emulsion is preferably used in terms of the discharge stability of an ink, image quality and durability of a print. The resin emulsion has a property of thickening and aggregating when landing to a recording medium such as paper, and has effects of inhibiting permeation of a coloring component and of facilitating the fixation on paper. Some kinds of the resin emulsion have an effect of enhancement in abrasion resistance of a print by forming a film on paper. Moreover, the resin emulsion is added to an ink so as to improve dispersion stability of a pigment. However, the durability of the ink repellent layer decreases because the ink easily fixes to the ink repellent layer.

A resin emulsion is not particularly limited and may be appropriately selected according to the purpose. Examples thereof include styrene-acrylic resins, acrylic silicone resins, urethane resins and fluorine resins. Of these, urethane resins are particularly preferable.

When the emulsion resin is used as a raw material for producing a pigment ink or after an ink is produced using the emulsion resin, the emulsion resin should exist as an O/W emulsion.

Polyurethane resin emulsions are classified into two types i.e. the one that is emulsified by using an emulsifier with a commonly used polyurethane resin which is relatively hydrophilic, and a self-emulsifiable emulsion in which a functional group capable of serving as an emulsifier is introduced to a resin itself by copolymerization. Both types of polyurethane resin emulsions can be used, however, the attention needs to be paid on a slight difference in dispersion stability between pigment and emulsion particles depending on the combination of pigment ink compositions. Among various combinations of a pigment and a dispersant, the one that is constantly excellent in dispersion stability is an anionic self-emulsifiable polyurethane emulsion resin. When such an emulsion resin is used, an ether polyurethane resin is more preferred than a polyester polyurethane resin or polycarbonate polyurethane resin in terms of fixation property and dispersion stability of a pigment. The reason is not clearly known, however, many non-ether polyurethane resins have weak solvent resistance and are likely to aggregate when stored under high-temperature conditions.

For the resin emulsion, a commercially available product can be used. Examples of the commercially available resin emulsions include J-450, J-734, J-7600, J-352, J-390, J-7100, J-741, J74J, J-511, J-840, J-775, HRC-1645, and HPD-71 (styrene-acrylic resin emulsions, manufactured by Johnson Polymer Inc.); UVA383MA (acryl-silicone resin emulsion, manufactured by BASF Corporation); AP4710 (acryl-silicone resin emulsion, manufactured by SHOWA HIGHPOLYMER CO., LTD.); SF460, SF460S, SF420, SF110, SF300, and SF361 (polyurethane resin emulsions, manufactured by Nippon Unicar Company Limited); and FE4300, FE4500, and FE4400 (fluorine resin emulsions, manufactured by ASAHI GLASS CO., LTD.). These may be used in combination. The resin emulsions are suitably combined so as to improve image quality and image durability while maintaining storage stability of an ink.

The amount of the resin emulsion in the inkjet ink, in resin solid content, is preferably 0.1% by mass to 20% by mass, and more preferably 0.2% by mass to 10% by mass. When the content of the resin emulsion is less than 0.1% by mass, the amount of the resin after dropped on a recording medium is not sufficient enough to cover the pigment, thus effect of abrasion resistance is small. When the amount of the resin emulsion is more than 20% by mass, it tends to be difficult to carry out printing by an inkjet method due to the excessively high viscosity of the ink.

-Water-Soluble Organic Solvent-

A water-soluble organic solvent as described below can be used in the inkjet ink so as to make an ink to have desired properties, prevent ink drying, and improve dissolution stability of each component of the ink of the present invention.

The water-soluble organic solvent is not particularly limited and may be appropriately selected according to the purpose. Examples thereof include polyhydric alcohols such as ethylene glycol, diethylene glycol, 1,3-butyl glycol, 3-methyl-1,3-butyl glycol, triethylene glycol, polyethylene glycol, polypropylene glycol, 1,5-pentanediol, 1,6-hexanediol, glycerin, 1,2,6-hexanetriol, 2-ethyl-1,3-hexanediol, ethyl 1,2,4-butanetriol, 1,2,3-butanetriol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether, and polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, and ε-caprolactam, γ-butyrolactam; amides such as formamide, N-methylformamide, N,N-dimethyl formamide; amines such as monoethanolamine, diethanolamine, triethylamine, sulfur-containing compounds such as dimethylsulfoxide, sulfolan, and thiodiethanol; propylene carbonate, and ethylene carbonate. These may be used alone or in combination. Of these, 1,3-butyl glycol, diethylene glycol, triethylene glycol, and glycerin are particularly preferable, in terms of prevention of nozzle clogging caused by ink drying, that is discharge failure of the ink caused by moisture vaporization, and in terms of prevention of improvement in color saturation of formed images.

The amount of the water soluble organic solvent added in the inkjet ink is preferably 10% by mass to 50% by mass, and more preferably 5% by mass to 40% by mass. When the amount is less than 10% by mass, the viscosity of ink after drying becomes excessively high. When the amount is more than 50% by mass, the viscosity of the ink becomes higher and moreover letter quality becomes poor when it is printed.

-Penetrating Agent-

A penetrating agent adjusts the surface tension of an ink so as to improve wettability to an inkjet head and recording device. Thus, the packing property is improved, and recording failure caused by air bubbles may not easily occur.

The penetrating agent is not particularly limited and may be appropriately selected according to the purpose. Examples thereof include polyvalent alcohol alkyl ethers and polyvalent alcohol aryl ethers such as diethylene glycol monophenylether, ethylene glycol monophenylether, ethylene glycol monoallylether, diethylene glycol monobutylether, propylene glycol monobutylether, triethylene glycol monobutylether, tetraethylene glycol chlorophenyl ether; diols such as 2-ethyl-1,3-hexanediol, 2,2,4-trimethyl-1,3-pentanediol and 2,2-dimethyl-1,3-propanediol; lower alcohols such as polyoxyethylene-polyoxypropylene block copolymer, ethanol and 2-propanol. Of these, as a polyhydric alcohol alkyl ether, diethylene glycol monobutyl ether is preferably used, and as a diol having 6 or more carbon atoms, 2-ethyl-1,3-hexanediol and 2,2,4-trimethyl-1,3-pentanediol are preferably used. Diols are preferably used because a water insoluble resin less aggregates. The amount of the penetrating agent in the inkjet ink is preferably 0.1% by mass to 20% by mass, and more preferably 0.5% by mass to 10% by mass, although it depends on the kinds of penetrating agents and desired properties. When the amount is less than 0.1% by mass, the permeability is insufficient. When the amount is more than 20% by mass, particulation property is adversely affected.

Other components are not particularly limited and may be appropriately selected according to the purpose. Examples of other components include anti-foaming agents, pH adjusting agents, antiseptic/antifungal agents, antirust agents, antioxidants, UV absorbers, oxygen absorbers, and photostabilizers.

The anti-foaming agent is not particularly limited and may be appropriately selected according to the purpose. Examples thereof include silicone anti-foaming agents, polyether anti-foaming agents and fatty acid ester anti-foaming agents. These may be used alone or in combination. Of these, the silicone anti-foaming agent is preferable in terms of being excellent in foam breaking effect.

Examples of the antiseptic/antifungal agents include 1,2-benzisothiazoline-3-one, sodium dehydroacetate, sodium sorbate, 2-pyridinethiol-1-oxide sodium, sodium benzoate, and pentachlorophenol sodium.

The pH adjusting agent is not particularly limited and any substance can be used according to the purpose, as long as it can adjust pH to 7 or more, without adversely affecting the ink to be prepared. Examples of the pH adjusting agents include amines such as diethanolamine and triethanolamine; hydroxides of alkali metal elements such as lithium hydroxide, sodium hydroxide, and potassium hydroxide; ammonium hydroxide, quaternary ammonium hydroxide, quaternary phosphonium hydroxide, and carbonates of alkali metals such as lithium carbonate, sodium carbonate, and potassium carbonate.

Examples of the antirust agents include acidic sulfites, a sodium thiosulfates, ammonium thiodiglycolate, diisopropyl ammonium nitrite, pentaerythritol tetranitrate, and dicyclohexylammonium nitrite.

Examples of the antioxidants include phenolic antioxidants (including hindered phenol antioxidants), amine antioxidants, sulfur antioxidants, and phosphorus antioxidants.

The inkjet ink of the present invention is produced by dispersing or dissolving at least a colorant, water, water-insoluble resin, fluorine surfactant, polyether-modified silicone oil, and other components as necessary in an aqueous solvent, and then stirring and mixing as necessary. The dispersing operation can be performed with a sand mill, a homogenizer, a ball mill, a paint shaker, and an ultrasonic dispersing machine, and stirring and mixing can be performed by using a stirring machine using a usual stirring blade, a magnetic stirrer, and a high-speed dispersing machine.

Physical properties of the inkjet ink of the present invention are not particularly limited and may be appropriately selected according to the purpose. For example, viscosity, surface tension and pH thereof preferably fall within the following ranges.

The ink has a viscosity of preferably 5 mPa·s to 20 mPa·s, and more preferably 6 mPa·s to 15 mPa·s at 25° C. When the viscosity is higher than 20 mPa·s, discharge stability may be difficult to ensure.

The ink preferably has a surface tension of 20 mN/m to 40 mN/m at 25° C. When the surface tension is less than 20 mN/m, the ink bleed outstands on a recording medium and stable jet may not be obtained. When the surface tension is more than 40 mN/m, the ink does not sufficiently permeate into a recording medium, and drying time may be longer.

The ink preferably has a pH of 7 to 10.

The color of the inkjet ink of the present invention is not particularly limited and may be appropriately selected according to the purpose. Examples of the colors include yellow, magenta, cyan, and black. When recording is carried out by using an ink set employing two or more colors, a multicolor image can be recorded, and when recording is carried out by using an ink set employing a full-color combination, a full-color image can be recorded.

The inkjet ink of the present invention can be advantageously used in printers employing the following inkjet heads: a so-called piezo-type inkjet head in which a piezoelectric element is used as a pressure generating unit that pressurizes ink located in an ink channel to deform an oscillation plate forming a wall surface of the ink channel, and the internal volume of the ink channel is changed, and then an ink droplet is discharged (see Japanese Patent Application Laid-Open (JP-A) No. 2-51734), a so-called thermal-type inkjet head that uses a heat-generating resistor to heat the ink in an ink channel and generate gas bubbles (see JP-A No. 61-59911), and an electrostatic inkjet head in which an oscillation plate forming a wall surface of an ink channel is disposed opposite an electrode and the oscillation plate is deformed by electrostatic forces generated between the oscillation plate and the electrode, whereby the internal volume of the ink channel is changed and an ink droplet is discharged (see JP-A No. 6-71882).

The inkjet ink of the present invention can be suitably used in a variety of fields in image recording apparatuses (printers, etc.) employing an inkjet recording method. For instance, the inkjet ink can be used in a printer which has a function of facilitating printing fixation by heating recording paper and the inkjet ink at a temperature of 50° C. to 200° C. during, before or after printing. The inkjet ink can be particularly suitably used in the ink cartridge, the inkjet record, the inkjet recording apparatus and the ink recording method of the present invention.

(Ink Cartridge)

In an ink cartridge used in the present invention, the inkjet ink of the present invention is contained in a container. The ink cartridge may have other components which are appropriately selected, as necessary.

The container is not particularly limited, and the shape, structure, size and material thereof may be appropriately selected according to the purpose. For example, the container having at least an ink bag formed from an aluminum laminated film, a resin film, or the like is preferred.

The ink cartridge will be explained below with reference to FIGS. 1 and 2. Here, FIG. 1 shows an example of an ink cartridge used in the present invention, and FIG. 2 also shows an ink cartridge 200 shown in FIG. 1, which includes a case (housing).

Figure 2:
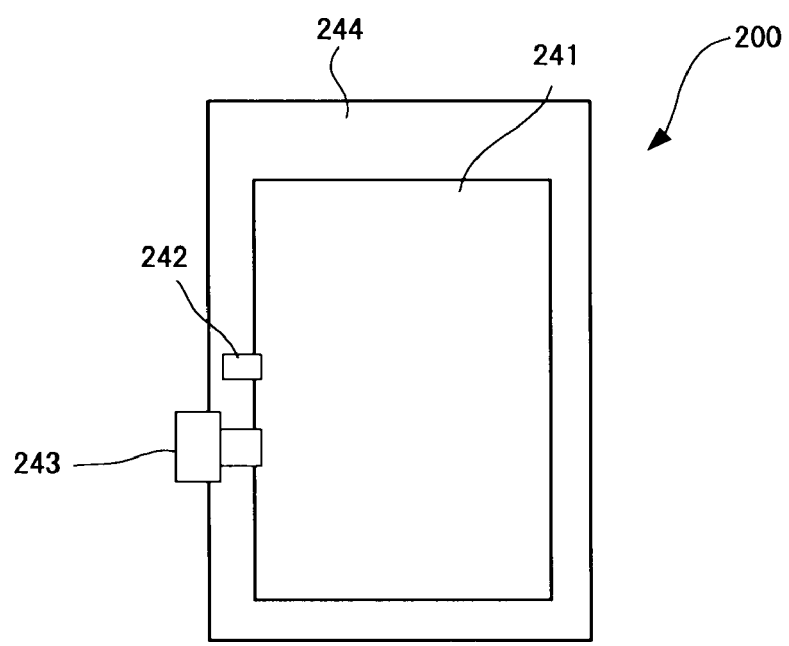
FIG. 2 shows a schematic view of an example of an ink cartridge including a case (housing) shown in FIG. 1

As shown in FIG. 1, in the ink cartridge 200, from an ink charging port 242 an ink bag 241 is filled with an ink and air is removed, and then the ink charging port 242 is closed by fusion bonding. When the ink cartridge is used, an ink discharge port 243 made from a rubber member is pierced with a needle of the apparatus body and the ink is supplied into the apparatus.

The ink bag 241 is formed from a packaging material such as an aluminum laminated film that is impermeable. As shown in FIG. 2, the ink bag 241 is usually contained inside a plastic cartridge case (housing) 244 and can be used by detachably mounting on inkjet recording apparatuses of various kinds.

The ink cartridge used in the present invention contains the inkjet ink of the present invention and can be used by detachably mounting on inkjet recording apparatuses of various kinds. It can be particularly advantageously used by detachably mounting on the below-described inkjet recording apparatus of the present invention.

(Inkjet Recording Apparatus and Inkjet Recording Method)

The inkjet recording apparatus of the present invention contains at least an inkjetting unit, and further includes other units suitably selected as necessary, such as a stimulus generating unit and a controlling unit.

The inkjet recording method of the present invention includes at least an inkjetting step, and further includes other steps suitably selected as necessary, such as a stimulus generating step and a controlling step.

The inkjet recording method of the present invention can be suitably performed by the inkjet recording apparatus of the present invention, and the inkjetting step can be suitably performed by the inkjetting unit. Also, other steps can be suitably performed by other units.

-Inkjetting Step and Inkjetting Unit-

The inkjetting step is a step of jetting the inkjet ink of the present invention so as to record an image on a recording medium by applying a stimulus to the inkjet ink.

The inkjetting unit is a unit configured to jet the inkjet ink of the present invention so as to record an image on a recording medium by applying a stimulus to the inkjet ink. The inkjetting unit is not particularly limited, and examples thereof include an inkjet head.

Examples of the inkjet heads include a so-called piezo-type inkjet head in which a piezoelectric element is used as a pressure generating unit that pressurizes ink located in an ink channel to deform an oscillation plate forming a wall surface of the ink channel, and the internal volume of the ink channel is changed, and then an ink droplet is discharged (see Japanese Patent Application Laid-Open (JP-A) No. 2-51734), a so-called thermal-type inkjet head that uses a heat-generating resistor to heat the ink in an ink channel and generate gas bubbles (see JP-A No. 61-59911), and an electrostatic inkjet head in which an oscillation plate forming a wall surface of an ink channel is disposed opposite an electrode and the oscillation plate is deformed by electrostatic forces generated between the oscillation plate and the electrode, whereby the internal volume of the ink channel is changed and an ink droplet is discharged (see JP-A No. 6-71882).

The stimulus can, for example, be generated by the stimulus generating unit, and the stimulus is not particularly limited and may be suitably selected according to the purpose. Examples thereof include heat (temperature), pressure, vibration and light. Each of these may be used alone or in combination. Of these, heat and pressure are preferable.

Examples of the stimulus generating units include heaters, pressurizers, piezoelectric elements, vibration generators, ultrasonic oscillators and lights. Specific examples thereof include a piezoelectric actuator such as a piezoelectric element, a thermal actuator that utilizes phase transition caused by film boiling of a liquid by using a thermoelectric conversion element such as an exothermic resistive element, a shape-memory-alloy actuator that utilizes metal phase transition caused by temperature variations, and an electrostatic actuator using electrostatic force.

The aspect of the jetting of the inkjet ink is not particularly limited and varies according to the kinds of the stimulus or the like. In the case where the stimulus is "heat", there is, for example, a method in which thermal energy corresponding to a recording signal is applied to the inkjet ink in a recording head, using a thermal head or the like, bubbles are generated in the inkjet ink by the thermal energy, and the inkjet ink is discharged as droplets from nozzle holes of the recording head by the pressure of the bubbles. Meanwhile, in the case where the stimulus is "pressure", there is, for example, a method in which by applying voltage to a piezoelectric element bonded to a site called a pressure chamber that lies in an ink flow path in a recording head, the piezoelectric element bends, the volume of the pressure chamber decreases, and thus the inkjet ink is discharged as droplets from nozzle holes of the recording head.

It is desirable that the inkjet ink droplets jetted be, for example, $3 \times 10^{-15}$ $m^3$ to $40 \times 10^{-15}$ $m^3$ (3 pL to 40 pL) in size, 5 m/s to 20 m/s in discharge velocity, 1 kHz or greater in drive frequency and 300 dpi or greater in resolution. The controlling unit is not particularly limited and may be suitably selected according to the purpose, as long as it can control operations of the aforementioned units. Examples thereof include apparatuses such as a sequencer and a computer.

Any material can be used as a material for the ink repellent layer, as long as it repels water. Specifically, examples thereof include silicone water repellent materials and fluorine water repellent materials.

Liquid silicone resins or elastomers curable at room temperature are known as silicone water-repellent materials, and an ink repellent layer is preferably formed by coating one of them on the base material surface and allowing it to stand in the air at room temperature to induce polymerization for curing.

Liquid silicone resins or elastomers curable by heating are also known as silicone water-repellent materials, and an ink repellent layer is preferably formed by coating one of them on the base material surface and curing by heating.

Liquid silicone resins or elastomers curable by UV radiation are also known as silicone water-repellent materials, and an ink repellent layer is preferably formed by coating one of them on the base material surface and curing by irradiation with UV light.

The viscosity of the silicone water repellent material is preferably 1,000 cp (centipoises) or less.

With respect to the fluorine water repellent materials, various material are known, however, here, necessary water repellency is obtained by depositing a mixture of perfluoropolyoxethane and modified perfluoropolyoxethane (trade name: OPTOOL DSX manufactured by Daikin Industries, Ltd.) to a thickness of 1 Å to 30 Å (0.1 nm to 3 nm). Experimental results reveal that there are no difference in water repellency and wiping endurance for the Optool DSX films having a thickness of 10 Å (1 nm), 20 Å (2 nm), and 30 Å (3 nm).

Thus, the thickness of the fluorine water repellent layer is more preferably 1 Å to 20 Å (0.1 nm to 2 nm) in view of cost. A pressure sensitive adhesive tape in which an adhesive material is applied to a resin film is attached to a surface of the fluorine water repellent layer and assists an excimer laser process.

The surface of the nozzle plate of the inkjet head in the inkjetting unit has an ink repellent layer containing a silicone resin.

The silicone resin is a resin having a siloxane bond consisting of Si and O as a basic skeleton and is commercially available in various configurations such as oils, resins, and elastomers and is provided with various physical properties such as heat resistance, releasing property, anti-foaming property, and adhesion property, besides ink repellency which is important in the present invention. Silicone resins include silicone resins which are curable at room temperature, heat-curable silicone resins, ultraviolet ray curable resins, and the like, and the silicone resin may be selected in accordance with the production method and application.

Examples of methods of forming the ink repellent layer containing a silicone resin on a nozzle surface include a method in which a liquid silicone resin material is vacuum evaporated to thereby form an ink repellent layer on a nozzle surface; a method in which a silicone oil is plasma-polymerized to thereby form an ink repellent layer on a nozzle surface, a method in which an ink repellent layer is formed by a coating method such as spin-coating, dipping, spray coating, and a method of forming an ink repellent layer by electrocoating. When the ink repellent layer is formed by a method other than electrocoating, a nozzle hole and the back surface of a nozzle plate are masked with a photoresist, a water soluble resin or the like and an ink repellent layer is formed, and then the photoresist is peeled off and removed from the back surface of the nozzle plate, thereby an ink repellent layer containing a silicone resin can be formed on only the surface of the nozzle plate. The attention needs to be paid when the photoresist is peeled off using a strongly alkaline peeling agent, the peeling agent may damage the ink repellent layer.

The ink repellent layer containing a silicone resin has a thickness of preferably 0.1 μm to 5.0 μm, and more preferably 0.1 μm to 1.0 μm. When the thickness of the ink repellent layer is less than 0.1 μm, the resistance to wiping may be poor and the ink repellency may degrade in the case where the inkjet head is used for a long period of time. When the thickness is more than 5.0 μm, the production cost may increase because the ink repellent layer is excessively thickened.

The surface roughness Ra of the ink repellent layer is preferably 0.2 μm or less. By making the surface roughness Ra of 0.2 μm or less, it is possible to reduce the amount of wiping residues during wiping.

FIGS. 8 and 9A to 9C are cross-sectional views of the nozzle plate of the inkjet head of the present invention.

In the present embodiment, a nozzle plate 32 which is a base material of the inkjet head is produced by Ni electroforming, an ink repellent layer 31 that is a silicone resin film having a surface roughness (Ra) of preferably 0.2 μm or less.

Figure 9A:
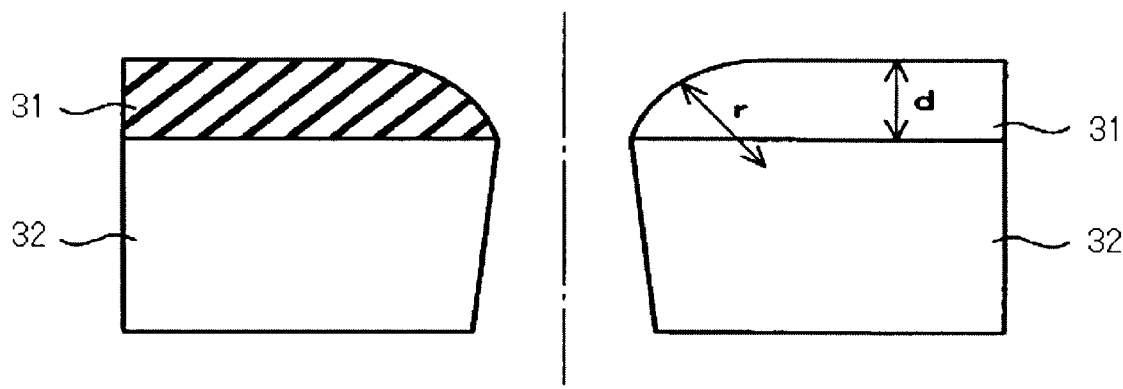
FIG. 9A shows a schematic explanatory view of an example of a nozzle plate of an inkjet head of the present invention.
Figure 9B:
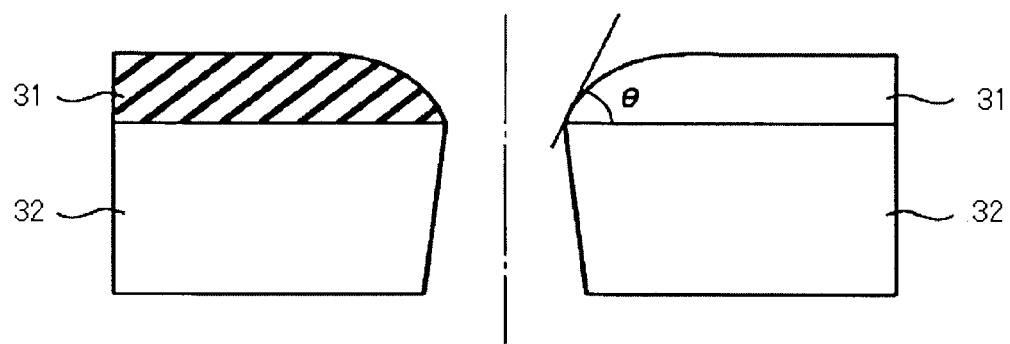
FIG. 9B shows a schematic explanatory view of another example of a nozzle plate of an inkjet head of the present invention.
Figure 9C:
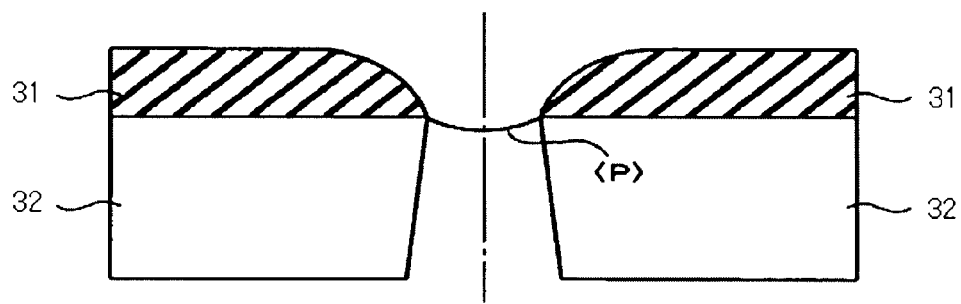
FIG. 9C shows a schematic explanatory view of still another example of a nozzle plate of an inkjet head of the present invention.

During filling with an ink, as shown in FIG. 9C, a meniscus (liquid surface) P is formed in a boundary portion of the ink repellent layer 31 composed of a silicon resin film and the nozzle plate 32.

The ink repellent layer is so formed that a cross section area in a plane perpendicular to a central line of an opening of the ink repellant layer which is formed on the surface provided with opening (nozzle) for ink discharge in the inkjet head in the vicinity of the opening increases successively with distance from the surface of the base material.

The ink repellent layer preferably has a curved surface shape in the vicinity of the opening. Further, the curvature radius of the curve of the ink repellent layer in the vicinity of the opening in the cross section of the plane including the central line of the opening is preferably equal to or more than the thickness of the ink repellent layer. Further, it is also preferred that the curve of the ink repellent layer from the edge of the opening to the vicinity of the opening in the cross section of the plane including the central line of the opening be a substantially circular-arc curve, and the curvature radius of the circular arc is preferably equal to or more than the thickness of the ink repellent layer. A tangent line to the ink repellent layer passing through the edge of the opening in the cross section of the plane including the central line of the opening preferably forms an angle of less than 90 degrees with the nozzle member surface including the edge.

The opening of the nozzle plate 32 is so provided that the cross section formed by the plane perpendicular to the central line represented by a dot-dash line in FIGS. 9A to 9C has a substantially round shape with this central line as a center. Further, the ink repellent layer 31 formed on the ink discharge surface in the nozzle plate 32 is formed such that the cross section area of the opening portion formed by the plane perpendicular to the central line increases successively with distance from the nozzle plate 32.

More specifically, as shown in FIG. 9A, in the open portion of the ink repellent layer 31, the curve from the opening edge of the nozzle plate 32 in the vicinity of the opening has a round shape with a curvature radius "r". This curvature radius r is preferably equal to or more than the thickness d of the ink repellent layer 31 outside the zone in the vicinity of the open portion.

The thickness "d" is a thickness of ink repellent layer 31 outside the round portion that is the open portion and preferably is the maximum thickness of the ink repellent layer.

Thus, the open portion of the ink repellent layer 31 that is connected to the opening of the nozzle plate 32 has a shape without sharp edges (smooth curve without sharp portions) and is a curve having no protruding zones. Therefore, when it is wiped with a wiper formed from a material such as rubber, the ink repellent layer 31 can be prevented from being separated from the nozzle plate 32 as a result of sharp portions being caught by the wiper.

Further, as shown in FIG. 9B a tangent line to the ink repellent layer 31 passing through the edge of the opening in the cross section along the plane including the central line of the opening of the nozzle plate 32 preferably forms an angle θ of less than 90 degrees with the surface of the nozzle plate 32 including the opening edge of the nozzle plate 32 connected to the edge of the opening portion.

Where the angle θ between the tangent line to the ink repellent layer 31 at the edge of the opening portion and the surface of the nozzle plate 32 is less than 90 degrees, as shown in FIG. 9C, a meniscus (liquid surface) P is formed with good stability in the boundary portion of the ink repellent layer 31 and the nozzle plate 32, and the possibility of the meniscus P being formed in the portion can be greatly reduced. As a result, because the meniscus formation surface is stabilized, ink discharge stability during image formation in the image forming apparatus using the inkjet head including the nozzle plate 32 can be improved.

A liquid silicone resin curable at room temperature is preferably used as the silicone resin used in the present embodiment and a resin of a type such that curing is accompanied by a hydrolysis reaction is even more preferred. In the below-described examples, SR2411 (manufactured by Dow Corning Toray Co., Ltd.) is used.

Table 1 below shows the results obtained by evaluating the shape of the ink repellent layer 31 from the opening edge of the nozzle plate 32 to the vicinity of the opening edge in the inkjet head of the present embodiment and the occurrence of ink residue around the nozzle, edge separation, and discharge stability.

TABLE 1

| Edge shape | | Ink residue | Edge separation | Discharge stability |
|---|---|---|---|---|
| Sharp tip is present | | Some ink residue occurs | Occurs | Good |
| No sharp tip (round shape) | θ ≦ 90° | None | None | Good |
| | θ > 90° | None | None | Poor |
| | r ≧ d | None | None | Good |
| | r < d | None | Some edge separation occurs | Poor |

The results shown in Table 1 demonstrate that where a substantially sharp tip is contained in the edge portion (in the vicinity of the opening portion edge) of the ink repellent layer 31, ink residue is observed around the nozzle and edge separation occurs due to wiping.

Figure 10A:
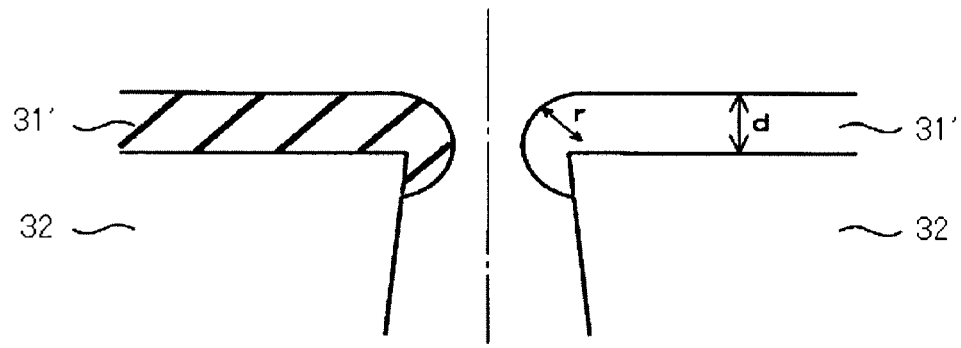
FIG. 10A shows a schematic explanatory view of an example of a nozzle plate of an inkjet head for comparison.
Figure 10B:
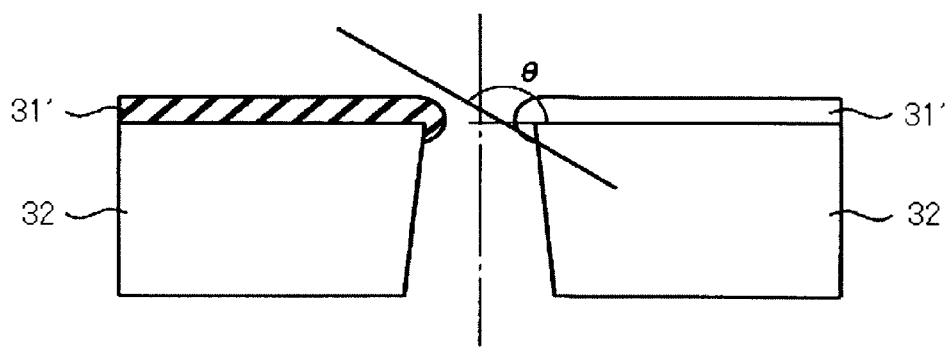
FIG. 10B shows schematic explanatory view of another example of a nozzle plate of an inkjet head for comparison.

With the round shape, no ink residues occur, for the purpose of comparison in the configuration with r<d as shown by an example in FIG. 10A, some edge separation is observed, and in the configuration with θ>90°, as shown in FIG. 10B, discharge of ink droplets is unstable.

Figure 10C:
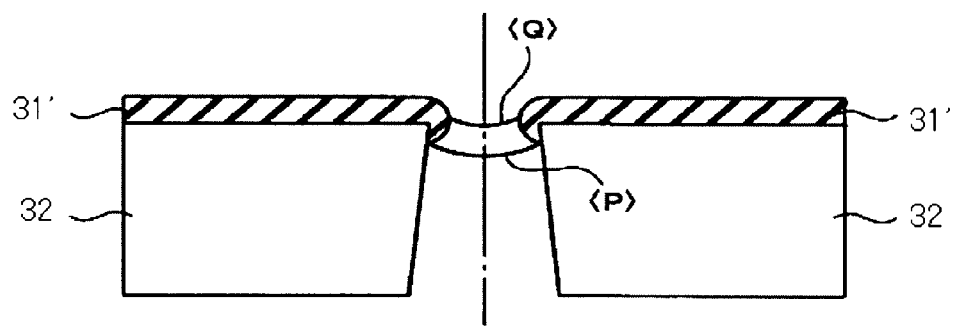
FIG. 10C shows schematic explanatory view of still another example of a nozzle plate of an inkjet head for comparison.

Further, when r<d and θ>90°, as shown in FIG. 10C, a meniscus (liquid level) P can be formed in the boundary portion of the ink repellent layer 31 and nozzle plate 32 during ink filling and a meniscus Q can be formed in the convex portion (a portion in which the area of the cross section perpendicular to the central line in the open portion is the smallest) facing the center of the open portion of the ink repellent layer 31'. As a result, ink discharge stability may sometimes vary during image recording in the inkjet recording apparatus using the inkjet head including the nozzle plate 32.

A method for producing a nozzle member of the inkjet head of the above-described embodiment will be described below.

Figure 11:
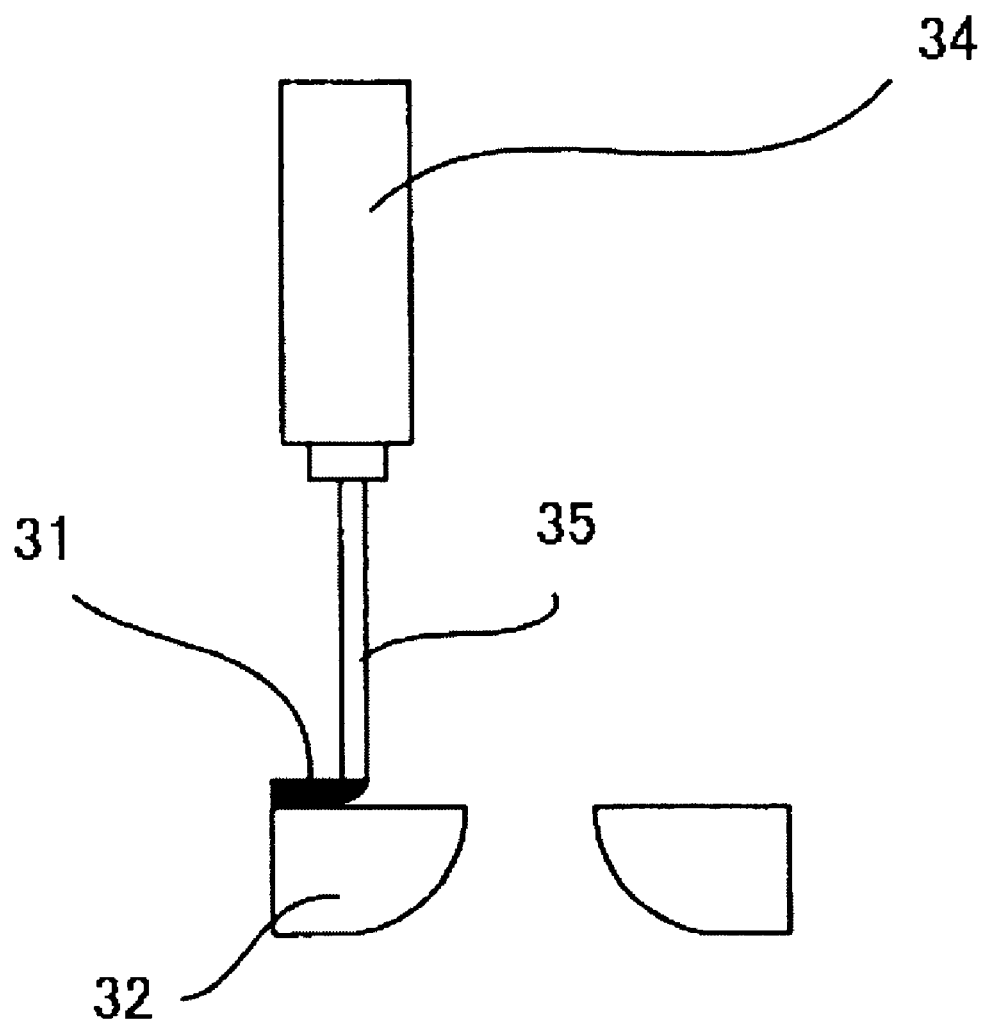
FIG. 11 shows a state in which an ink repellent layer is formed by coating a silicone resin using a dispenser.

FIG. 11 shows a configuration in which an ink repellent layer 31 is formed by coating a silicone resin with a dispenser 34 of the present embodiment.

The dispenser 34 is disposed for coating a silicone solution on the ink discharge surface side of the nozzle 32 produced by Ni electroforming, and the ink repellent layer 31 can be selectively formed on the ink discharge surface of the nozzle plate 32, as shown in the above-described FIG. 8 and FIGS. 9A to 9C, by scanning the dispenser 34, while discharging the silicone solution from the tip of a needle 35 and maintaining a predetermined constant spacing between the nozzle plate 32 and the tip of the needle 35.

The silicone resin used in the present embodiment is a silicone resin curable at normal temperature (SR2411 manufactured by Dow Corning Toray Co., Ltd., and having a viscosity of 10 mPa·s). A certain accumulation of the silicone is observed in the nozzle hole and the back surface of the nozzle plate. The ink repellent layer 31 (silicone resin film) that is selectively formed in the above-described manner has a thickness of 1.2 μm and a surface roughness (Ra) of 0.18 μm.

Figure 12A:
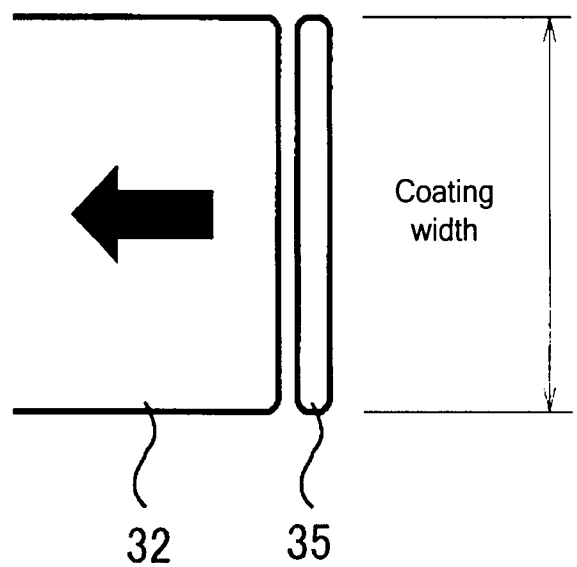
FIG. 12A shows a relation between a coating orifice at a tip of a needle and a coating width on a nozzle plate which is a coating object, according to the present invention.

The coating orifice at the tip of the needle 35 of the present embodiment, as shown in FIG. 12A, is ensured to have a width equal to the coating width of the nozzle plate 32 which is the coating object. As a result, coating of the entire coating object can be completed by scanning the dispenser 34 once in the coating direction.

Figure 12B:
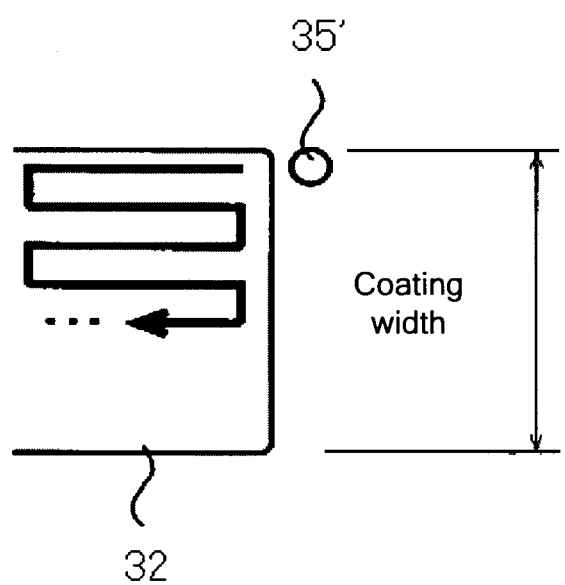
FIG. 12B shows a relation between a coating orifice at a tip of a needle and a coating width on a nozzle plate which is a coating object, according to a common technology.

Thus, the scanning direction for coating operation can be only one direction, and as shown in FIG. 12B the changing the direction to perform scanning in the opposite direction can be eliminated. Here, as shown in FIG. 12B, the tip of the conventional needle 35 is much narrower than the coating width on the nozzle plate 32. Therefore, in order to complete scanning of the entire scanning object, it is necessary to perform scanning in a plurality of directions by changing the scanning direction for the coating operation by 90°, shifting the tip of the needle, and performing scanning in the opposite direction. As a result, a coating film having a uniform thickness is difficult to obtain on the entire coating object.

According to the present embodiment, the width of the coating orifice at the tip of the needle 35 is ensured to be equal to the coating width on the nozzle plate 32 which is the coating object, whereby a uniform coating thickness can be obtained over the entire coating object and the surface of the nozzle plate can be finished with good accuracy.

Figure 13:
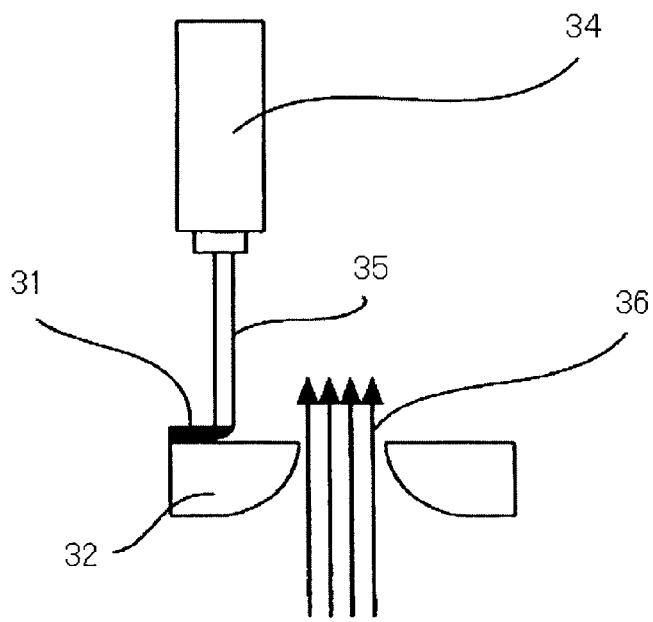
FIG. 13 shows a coating operation using a dispenser.

FIG. 13 shows a coating operation using the dispenser 34 of the present embodiment. The basic configuration is identical to that shown in FIG. 11, but a silicone solution is coated, while spraying gas 36 from a nozzle hole (opening) of the nozzle plate 32. As the gas 36, a variety of gases which do not easily participate in chemical reaction with silicone to be coated may be used. For example, air can be used. By performing coating, while spraying the gas 36 from the nozzle hole, it is possible to form the ink repellent layer 31 (silicone resin film) only on the nozzle surface, excluding the nozzle hole of the nozzle plate 32.

Figure 14:
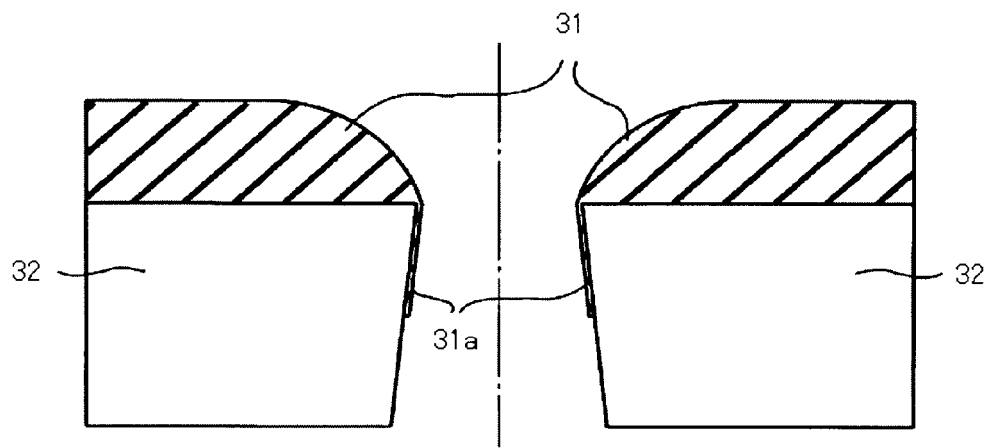
FIG. 14 shows a state in which an ink repellent layer consisting of a silicone resin is formed in an inner wall of a nozzle in a desired depth.

Further, when coating is performed by using a similar silicone solution, but without spraying the gas 36 as described above, and then spraying the gas 36 from the nozzle 32 after the silicone solution has permeated to the predetermined depth, it is possible to form an ink repellent layer consisting of a silicone resin to a desired depth (for example, about several μm) on the inner wall of the nozzle, as shown in FIG. 14. Thus, in addition to the above-described ink repellent layer 31 on the ink discharge surface, a very thin ink repellent layer 31a (ink repellent layer on the inner wall of the opening) can be formed to the predetermined depth from the opening edge of the nozzle plate 32.

Wiping is performed using an EPDM rubber (rubber hardness 500) with respect to the ink repellent layer 31 of the nozzle plate produced in the above-described manner. The results obtained demonstrated that the ink repellent layer 31 of the nozzle plate can maintain good ink repellency with respect to 1,000 times of wiping. The nozzle member having the ink repellent layer formed thereof was immersed into ink at 70° C. for 14 days. The results obtained demonstrated that unchanged ink repellency could be maintained even after the immersion.

Figure 15:
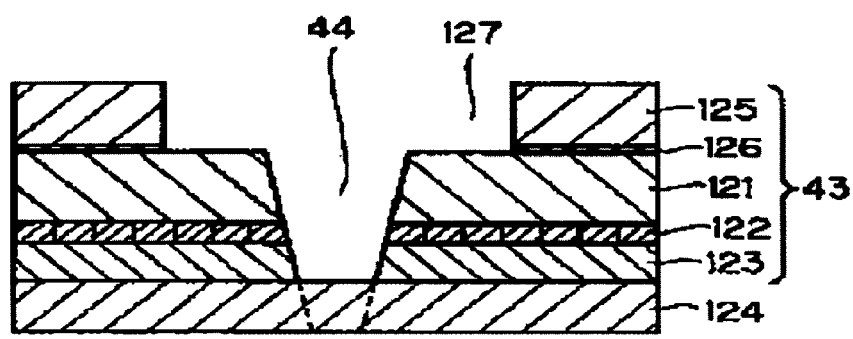
FIG. 15 shows an example of an inkjet head used in the present invention and shows a state where a nozzle hole is formed by an excimer laser processing.

FIG. 15 shows an example of an inkjet head used in the present invention and shows a state where a nozzle hole is formed by an excimer laser processing. A nozzle plate 43 is obtained by joining a resin member 121 and a high-rigidity member 125 with a thermoplastic adhesive 126. A $SiO_2$ thin-film layer 122 and a fluorine-containing water-repellent layer 123 are successively laminated on the surface of the resin member 121, a nozzle hole 44 of a required diameter is formed in the resin member 121, and a nozzle linking orifice 127 that is linked to the nozzle hole 44 is formed in the high-rigidity member 125. The $SiO_2$ thin-film layer 122 is formed by a method that produces a relatively small amount of heat, that is, at a temperature within a range in which the resin member is not thermally affected. More specifically, the preferred methods include sputtering, ion-beam vapor deposition, ion plating, CVD (chemical vapor deposition), and P-CVD (plasma chemical vapor deposition).

From the standpoint of process time and material cost, it is preferred that the thickness of the $SiO_2$ thin-film layer 122 be the minimum required thickness within a range in which the adhesive strength is ensured. This is because if the thickness is too large, it sometimes hinders the formation of nozzle hole with the excimer laser. Thus, in some cases part of the $SiO_2$ thin-film layer 122 is not sufficiently processed and an unprocessed section remains even if a good nozzle hole shape is obtained in the resin member 121. Therefore, it can be said that the suitable thickness is within a range of 1 Å to 300 Å (0.1 nm to 30 nm) in which good adhesive strength can be ensured and no $SiO_2$ thin-film layer 122 remains during excimer laser processing. An even more preferred range is 10 Å to 100 Å (1 nm to 10 nm). Test results demonstrated that even at a $SiO_2$ film thickness of 30 Å (3 nm) sufficient adhesivity is obtained and no problems are associated with excimer laser processability. Further, extremely small processing residues are observed at a film thickness of 300 Å (30 nm), and rather large processing residues are generated when the thickness exceeds 300 Å (30 nm), these residues creating an abnormal nozzle shape that cannot be used.

Figure 16:
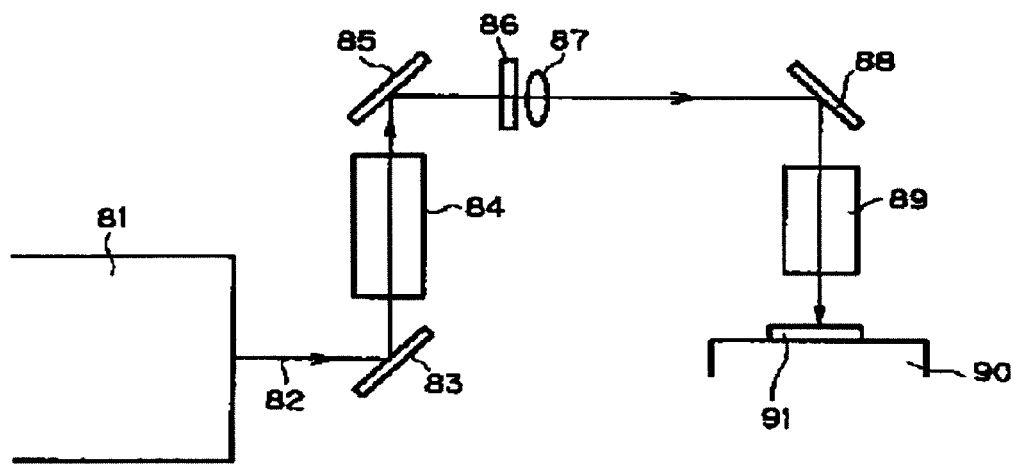
FIG. 16 shows an example of a configuration of an excimer laser processing apparatus for use in nozzle hole formation.

FIG. 16 shows an example of a configuration of an excimer laser processing apparatus for use in nozzle hole formation. An excimer laser beam 82 emitted from a laser generator 81 is reflected by mirrors 83, 85, 88 and guided to a processing table 90. A beam expander 84, a mask 86, a field lens 87, and an image-forming optical system 89 are provided in the predetermined positions of an optical path by which the laser beam 82 reaches the processing table 90 in order to obtain a laser beam optimal for a specific processing object. A processing object (nozzle plate) 91 is placed on the processing table 90 and receives the laser beam. The processing table 90 is a well-known XYZ table that is configured, if necessary, so that the processing object 91 can be moved to be irradiated with the laser beam in a desired position. The use of an excimer laser is explained herein, but a variety of lasers can be used, provided that they are short-wavelength UV lasers enabling the ablation processing.

FIG. 17A to FIG. 17F schematically show a process for producing a nozzle plate in the method for producing the inkjet head used in the present invention.

Figure 17A:
FIG. 17A shows a material serving as a base material for a nozzle forming member.

FIG. 17A shows a material serving as a base material for a nozzle forming member. Here, for example, a powder-free film of Kapton (trade name), which is a polyimide film manufactured by DuPont, is used as the resin film 121. In a typical polyimide film, particles such as $SiO_2$ (silica) are added to the film material to improve handleability (sliding ability) in a roll film handling apparatus. When a nozzle hole formation is carried out with an excimer laser, an abnormal nozzle shape is sometimes obtained because the $SiO_2$ (silica) particles are difficult to process with the excimer laser. Therefore, in the present invention, a film, to which $SiO_2$ (silica) particles have not been added, is used.

Figure 17B:
FIG. 17B shows a step in which a $SiO_2$ thin-film layer is formed on a surface of a resin film.

FIG. 17B shows a step in which the $SiO_2$ thin-film layer 122 is formed on the surface of the resin film 121. A sputtering method performed in a vacuum chamber is suitable for forming the $SiO_2$ thin-film layer 122. The appropriate film thickness of the thin-film layer 122 is several angstroms to 200 Å (20 nm). Here, the $SiO_2$ thin-film layer 122 having a thickness of 10 Å to 50 Å (1 nm to 5 nm) is formed. Using a sputtering method in which Si is sputtered and then a $SiO_2$ film is formed by bombarding the Si surface with $O_2$ ions is effective in terms of improving the adhesive strength of the $SiO_2$ film to the resin film 121, obtaining a homogeneous dense film, and improving wiping endurance of the water repellent film.

Figure 17C:
FIG. 17C shows a step in which a fluorine-containing water repellent agent is coated over a surface of a $SiO_2$ thin-film layer.

FIG. 17C shows a step in which a fluorine-containing water repellent agent 123a is coated over a surface of a $SiO_2$ thin-film layer 122. A method employing a spin coater, a roll coater, screen printing, or a spray coater can be used for coating the fluorine-containing water repellent agent, but a method for forming the film by vapor deposition is more effective because it improves adhesivity of the water-repellent film. An even better effect can be obtained with vacuum deposition by performing vacuum deposition in a vacuum chamber directly after forming the $SiO_2$ thin-film layer 122 as shown in FIG. 17B. In the conventional process, the workpiece is removed from the vacuum chamber once the $SiO_2$ thin-film layer 122 has been formed. As a result, impurities or the like adhere to the workpiece surface, thereby degrading adhesion. A variety of materials are known as fluorine-containing water repellent materials. Here, water repellency necessary with respect to the ink can be obtained by using perfluoropolyoxetane, modified perfluoropolyoxetane, a mixture thereof as a fluorine amorphous compound. The aforementioned Optool DSX, manufactured by Daikin Industries, Ltd. is called "an alkoxysilane-terminated modified perfluoropolyether."

Figure 17D:
FIG. 17D shows a step of allowing the deposited water repellent film to stand in the air.

FIG. 17D shows a step of allowing the deposited water repellent film to stand in the air. With this process, the fluorine-containing water-repellent agent 123a and the $SiO_2$ thin-film layer 122 are chemically bonded via moisture present in the air and the fluorine-containing water-repellent layer 223 is formed.

Figure 17E:
FIG. 17E shows a step of pasting the adhesive tape.

FIG. 17E shows a step of pasting the adhesive tape 124. The adhesive tape 124 is attached on the surface coated with the fluorine-containing water repellent layer 123. The adhesive tape 124 is attached so that no gas bubbles are generated. Where gas bubbles are generated, quality of the nozzle hole opened in a location where a gas bubble is present is sometimes degraded by the adhesion of foreign matter during processing.

Figure 17F:
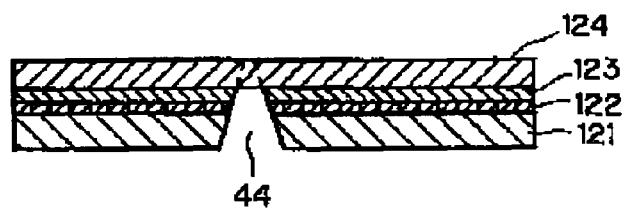
FIG. 17F shows a step of forming a nozzle hole.

FIG. 17F shows a step of forming the nozzle hole 44. In this step the nozzle hole 44 is formed by irradiating with an excimer laser from the side of the polyimide film 121. After the nozzle hole 44 has been formed, the adhesive tape 124 is peeled off. Here, the explanation of the high-rigidity member 125 used to improve the rigidity of the nozzle plate 43 that is explained with reference to FIG. 15 is omitted, but where the high-rigidity member is applied, the step is implemented between the step shown in FIG. 17D and the step shown in FIG. 17E.

Figure 18:
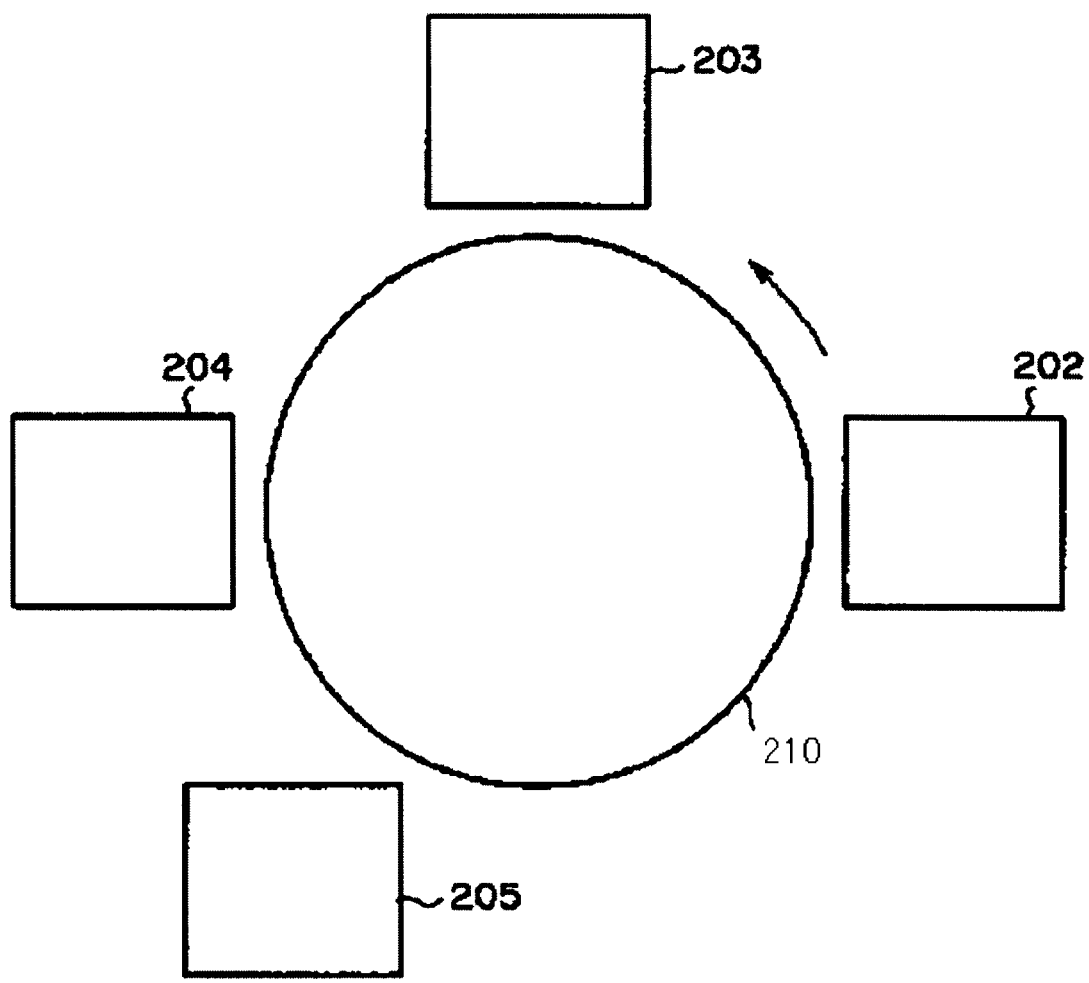
FIG. 18 schematically shows an example of an apparatus used in producing an inkjet head by a method for producing the inkjet head.

FIG. 18 schematically shows an apparatus used in producing an inkjet head by the method for producing the inkjet head used in the present invention.

This apparatus implements the so-called "metamode process" developed by Optical Coating Laboratory Inc. (OCLI, USA), and used for producing antireflective films and contamination-preventing films for displays or the like. As shown in FIG. 18, a Si sputter 202, an $O_2$ ion gun 203, a Nb sputter 204, and an Optool deposition unit 205 are disposed as stations in four locations around a drum 210, and the entire configuration is disposed in an evacuated chamber. First, Si is sputtered with the Si sputter 202, and then $SiO_2$ is obtained by bombarding the Si with $O_2$ ions with the $O_2$ ion gun 203. Nb and Optool DSX are then appropriately vapor deposited with the Nb sputter 204 and Optool deposition unit 205. In the case of an antireflective film, vapor deposition is performed after Nb and $SiO_2$ are stacked to obtain the necessary number of layers of a predetermined thickness. In the case of the present invention, the function of antireflective film is not required. Therefore, Nb is not necessary, and $SiO_2$ and Optool DSX may be deposited by one layer each. With this apparatus, as described hereinabove, vapor deposition of Optool DSX can be implemented inside the vacuum chamber directly after the $SiO_2$ thin film 122 has been deposited.

The ink repellent layer has a critical surface tension of preferably 5 mN/m to 40 mN/m, and more preferably 5 mN/m to 30 mN/m. When the critical surface tension exceeds 30 mN/m, a phenomenon by which the nozzle plate is over-wetted with the ink in long-term use occurs. As a result, curving of ink discharge trajectory or abnormal formation of ink droplets sometimes occurs in repeated printing. On the other hand, when the critical surface tension exceeds 40 mN/m, the over-wetting of the nozzle plate occurs from the beginning, whereby curving of ink discharge trajectory or abnormal formation of ink droplets sometimes occurs from the beginning.

In actual implementation, the ink repellent material shown in Table 2 is coated on an aluminum board and dried by heating to produce a nozzle plate having an ink repellent layer. Results obtained in measuring the critical surface tension of the ink repellent layer are shown in Table 2.

Here, the critical surface tension can be found by a Zisman method. Thus, a liquid having a known surface tension is dropped on the ink repellent layer, a contact angle θ is measured, and a line descending to the right (Zisman Plot) is obtained by plotting the surface tension of the liquid against the x axis and cos θ against the y axis. The surface tension at a point where the line is Y=1 (θ=0) can be calculated as the critical surface tension γc. Examples of other methods suitable for finding the critical surface tension include a Fowkes method, an Owens and Wendt method, and a Van Oss method.

Similarly to the above-described method for producing an inkjet head, an inkjet head is produced by using the nozzle plate having an ink repellent layer. The below-described cyan ink is sprayed thereonto. The jetting process of the ink is videotaped and observed. For all the nozzle plates used, accurate atomization and excellent discharge stability are confirmed. The results are shown in Table 2.

<Cyan Ink>

An appropriate quantity of ion-exchanged water is added to 20.0% by mass of polymer ultrafine particle dispersion containing a copper phthalocyanine pigment, 23.0% by mass of 3-methyl-1,3-butanediol, 8.0% by mass of glycerin, 2.0% by mass of 2-ethyl-1,3-hexanediol, 2.5% by mass of FS-300 (manufactured by DuPont) as a fluorine-containing surfactant, 0.2% by mass of Proxel LV (manufactured by Avecia Co., Ltd.) as an antiseptic/antifungal agent, and 0.5% by mass of 2-amino-2-ethyl-1,3-propanediol to obtain 100% by mass, and then filtration is performed with a membrane filter having a pore diameter of 0.8 µm. A cyan ink is thus prepared.

TABLE 2

| | Product Name | Critical surface tension | Discharge stability |
|---|---|---|---|
| Dow Corning Toray Co., Ltd. | SR2411 | 21.6 mN/m | Good |
| Shin-Etsu Chemical Co., Ltd. | KBM7803 | 16.9 mN/m | Good |
| Shin-Etsu Chemical Co., Ltd. | KP801M | 6.6 mN/m | Good |

One embodiment for the inkjet recording apparatus of the present invention will be described below with reference to the drawings.

Figure 3:
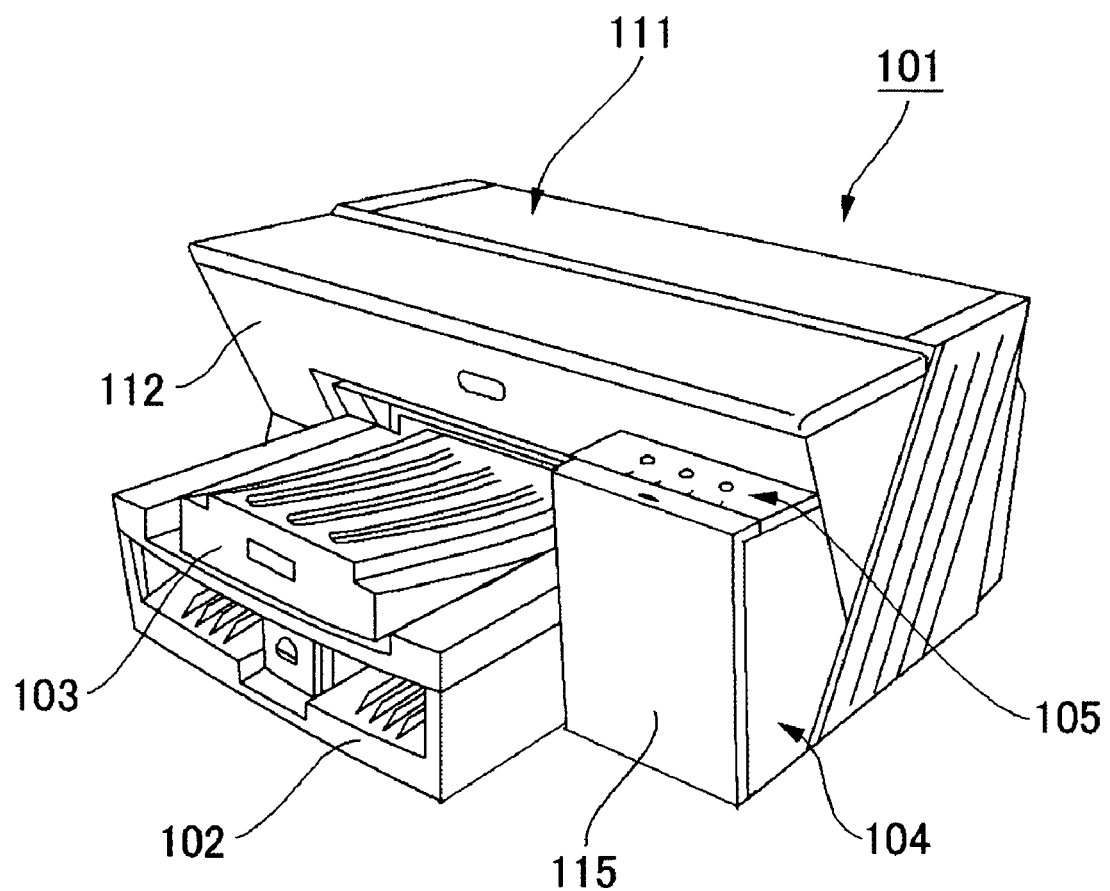
FIG. 3 shows a perspective explanatory view of an example of an inkjet recording apparatus of the present invention.

An inkjet recording apparatus shown in FIG. 3 contains an apparatus body 101, a paper feed tray 102 which serves to load papers and is mounted on the apparatus body 101, a paper discharge tray 103 which serves for stocking papers on which images have been recorded (formed) and is mounted on the apparatus body 101. The top surface of an upper cover 111 in the apparatus body 101 is substantially flat, a front surface 112 of a front cover in the main apparatus body 101 slants obliquely backward relative to a top surface, and below the slanted front surface 112, forwardly (front side) projecting paper discharge tray 103 and paper feed tray 102 are located. Further, in the end of the front surface 112, an ink cartridge loading unit 104 forwardly projects from the front surface 112 in a position of lower than the upper cover 111, and a control panel 105 containing control keys and a display is disposed on the upper surface of the ink cartridge loading unit 104. The ink cartridge loading unit 104 has a front cover 115 that can open and close for detachably mounting an ink cartridge.

Figure 4:
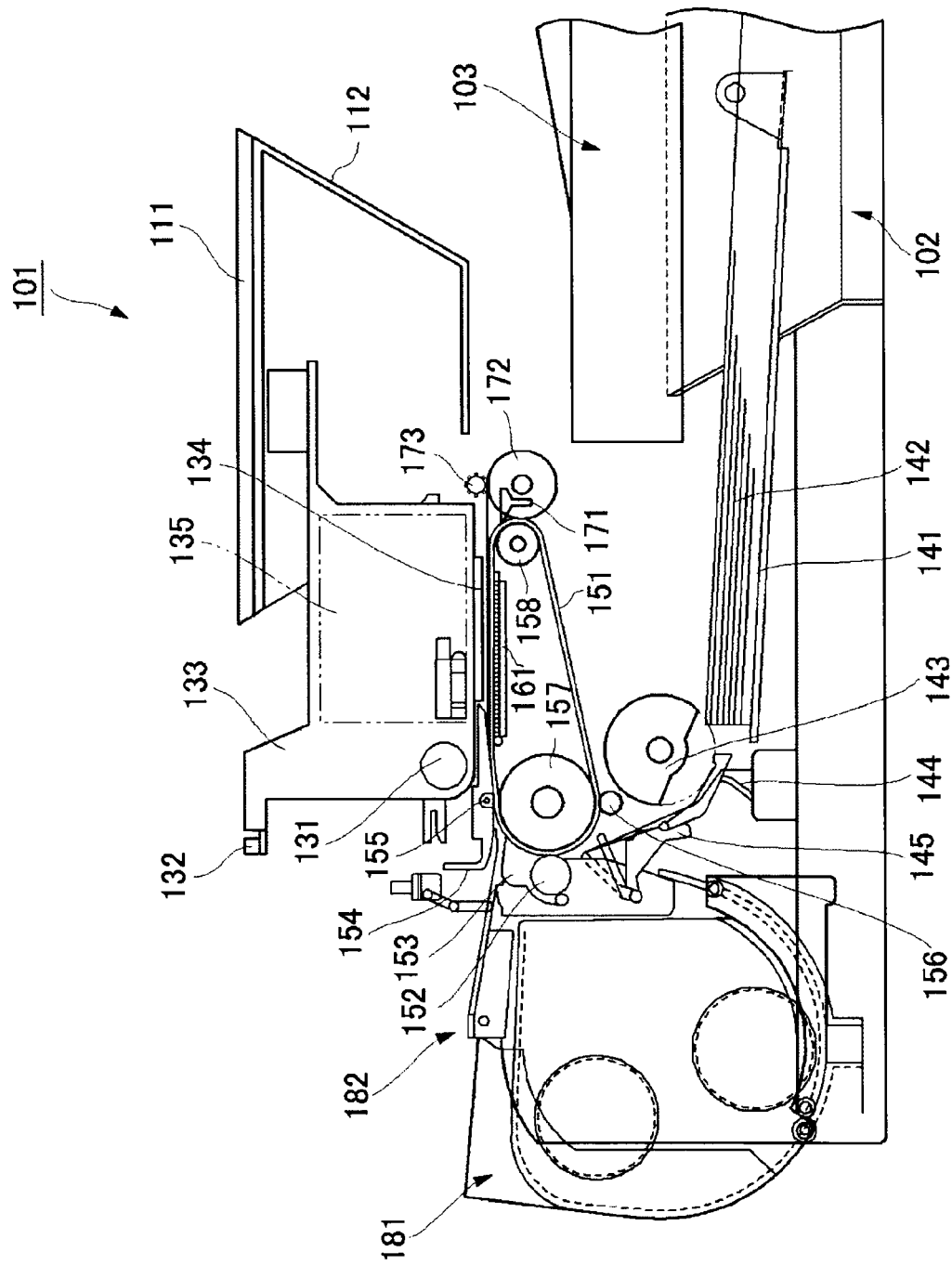
FIG. 4 shows a schematic view illustrating an example of an entire configuration of an inkjet recording apparatus of the present invention.
Figure 5:
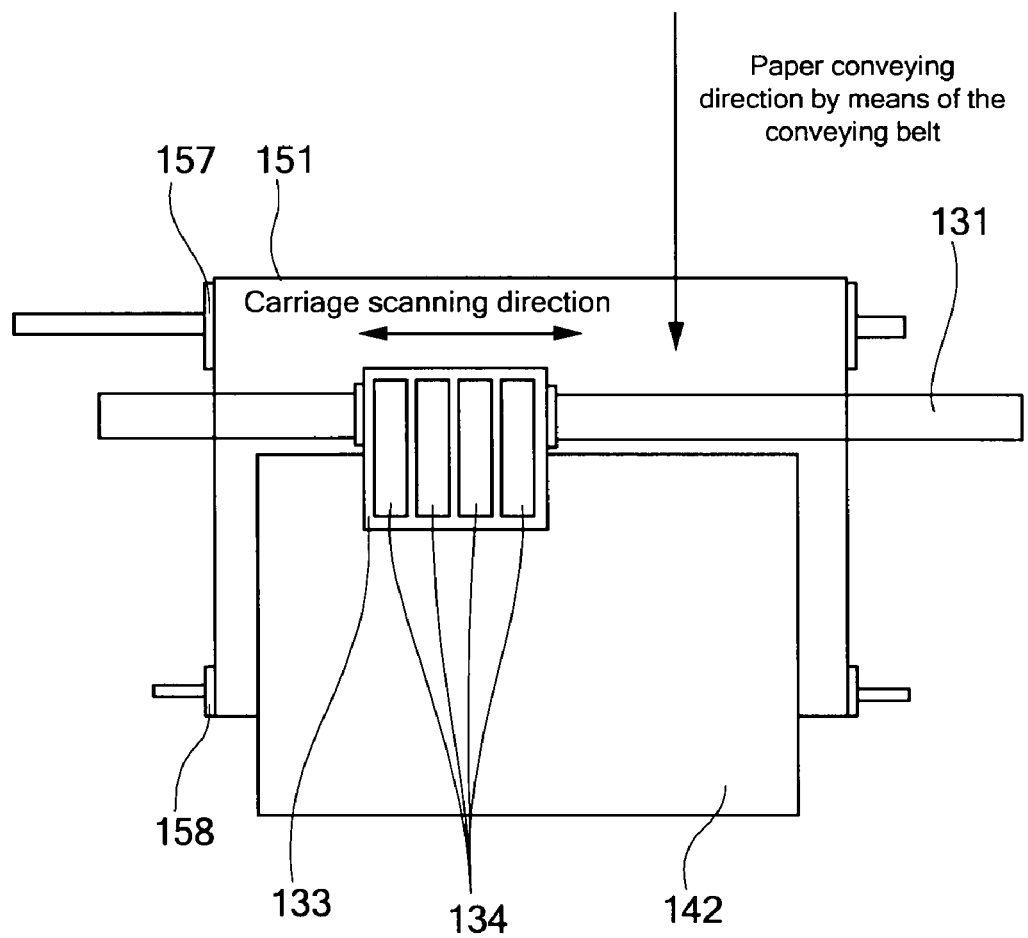
FIG. 5 shows a schematic enlarged view of an example of an inkjet head of the present invention.

Inside the apparatus body 101, as shown in FIGS. 4 and 5, a carriage 133 is supported so that it can slide in the main scanning direction by a guide rod 131 and a stay 132 that are guide members extending in the transverse direction between left and right side plates (not shown), and the cartridge can be moved for scanning in the direction shown by an arrow in FIG. 5 by a main scanning motor (not shown).

In the carriage 133, a recording head 134 composed of four inkjet heads discharge ink droplets of yellow, cyan, magenta, and black colors is equipped so that a plurality of ink discharge ports are arranged in the direction perpendicular to the main scanning direction and the ink droplet discharge directions face downward. A head constituting the recording head 134, which contains a piezoelectric actuator such as a piezoelectric element, a thermal actuator that utilizes phase transition caused by film boiling of a liquid by using a thermoelectric conversion element such as an exothermic resistive element, a shape-memory-alloy actuator that utilizes metal phase transition caused by temperature variations, or an electrostatic actuator using electrostatic forces as an energy generating unit for discharging ink, can be used.

The carriage 133 carries sub-tanks 135 for supplying with inks of each color to the recording head 134. The sub-tank 135 is supplied with the ink of the present invention via an ink supply tube (not shown) from the ink cartridge that is loaded into the ink cartridge loading unit 104.

On the other hand, a half-moon roller (paper feed roller) 143 that can feed papers 142 sheet by sheet from a paper loading unit (pressure plate) 141 and a separation pad 144 facing the paper feed roller 143 and made from a material with a high friction coefficient are provided as a paper feed unit for feeding paper 142 that was loaded on the paper loading unit (pressure plate) 141 of the paper feed tray 102, and the separation pad 144 is biased toward the paper feed roller 143.

A conveying belt 151 for electrostatically attracting the paper 142 and conveying it, a counter roller 152 for conveying the paper 142 conveyed from the paper feed unit via a guide 145 between the counter roller and the conveying belt 151, a conveying guide 153 that converts the direction of the paper 142 that is fed substantially vertically upward by substantially 90° to align the paper with the conveying belt 151, and a tip pressurization roller 155 that is biased toward the conveying belt 151 with a pushing member 154 are provided as a conveying unit for conveying the paper 142 fed from the paper feed unit below the recording head 134. A charging roller 156 is provided as a charging unit for charging the surface of the conveying belt 151.

The conveying belt 151 is an endless belt that is stretched between a conveying roller 157 and a tension roller 158 and can rotate in the belt conveying direction. The conveying belt 151, for example, has a surface layer serving as a paper attraction surface that is formed from a resin material having a thickness of about 40 μm, which resistance is not controlled, for example, a surface layer consisting of tetrafluoroethylene and ethylene (ETFE) and a back layer (medium resistance layer, ground layer) that is made from the same material as the surface layer, which resistance is controlled by carbon. A guide member 161 is disposed opposite a printing region created by the recording head 134 on the rear side of the conveying belt 151. A separation hook 171 for separating the paper 142 from the conveying belt 151, a paper discharge roller 172, and a paper discharge roller 173 are provided as a paper discharge unit for discharging the paper 142 that has been recorded in the recording unit 134. The paper discharge tray 103 is disposed below the paper discharge roller 172.

Further, the inkjet recording apparatus and inkjet recording method of the present invention can be applied to various recording systems by the inkjet recording method, and can be particularly advantageously applied to inkjet recording printers, facsimile machines, copiers, and printer-fax-copier machines.

An inkjet head of the present invention will be described below.

Figure 6:
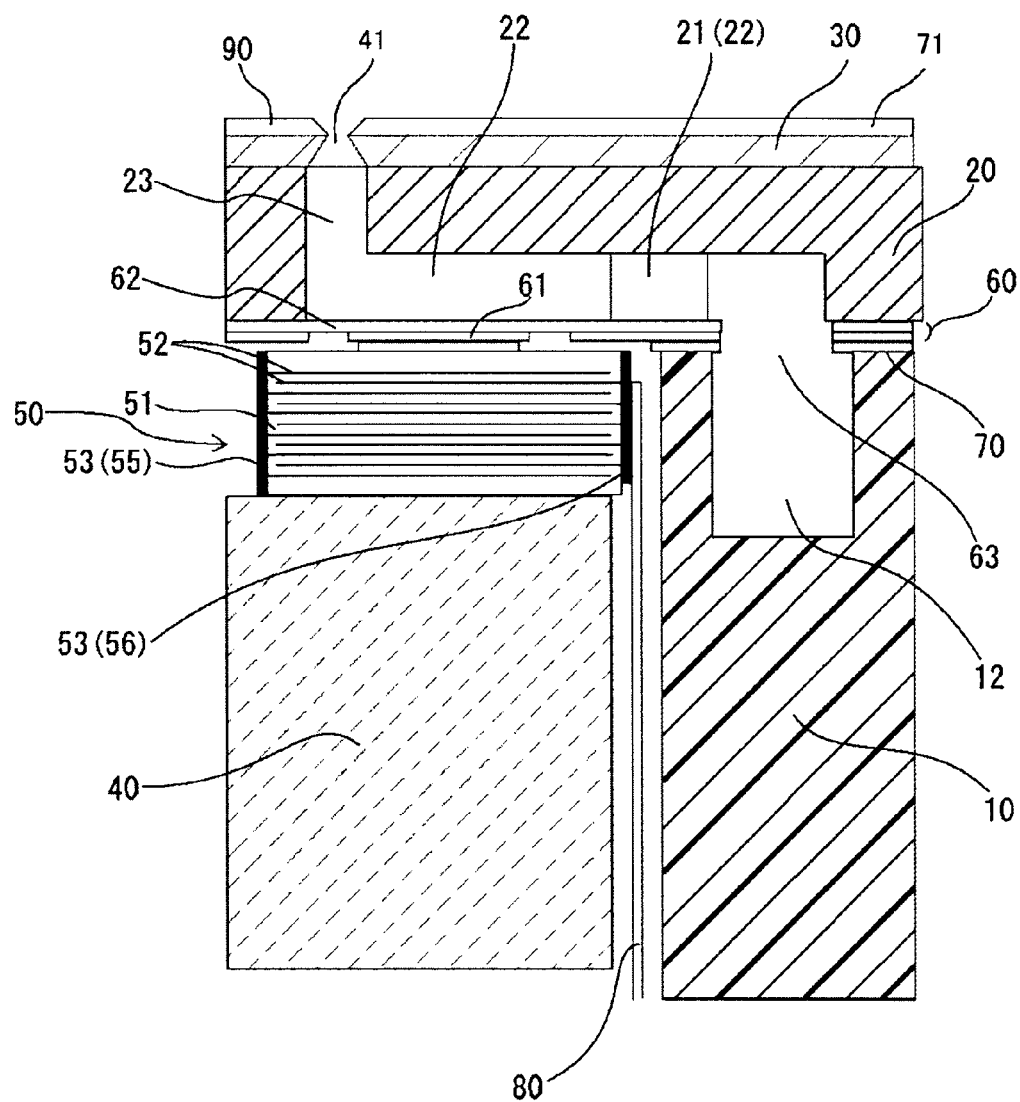
FIG. 6 shows an enlarged sectional view of an example of an inkjet head of the present invention.
Figure 7:
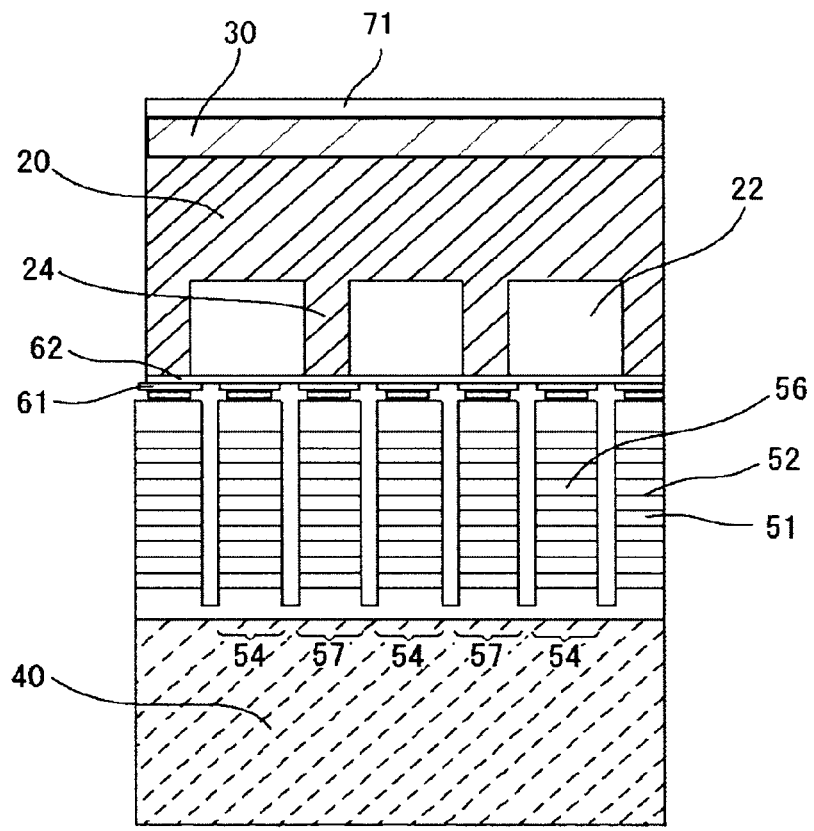
FIG. 7 shows an enlarged sectional view of an example of the main portion of an inkjet head of the present invention.
Figure 8:
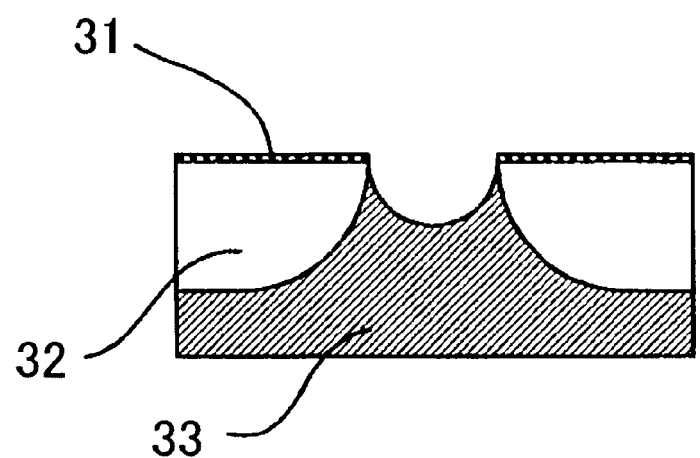
FIG. 8 shows a cross-sectional view of an example of a nozzle plate of the inkjet head of the present invention.

FIG. 6 shows an enlarged sectional view of an example of an inkjet head of the present invention. FIG. 7 shows an enlarged sectional view of an example of the main portion of an inkjet head of the present invention.

The inkjet head contains a frame 10 having formed therein a cavity serving as an ink supply port and a common liquid chamber 12, a flow path 20 having formed therein a cavity serving as a resistance portion 21 and a pressurized liquid chamber 22 and a link port 23 linked to a nozzle 41, a nozzle plate 30 forming the nozzle 41, an oscillation plate 60 having a convex portion 61, a diaphragm portion 62 and an ink inflow port 63, a laminated piezoelectric element 50 joined with an adhesive layer 70 to the oscillation plate 60, and a base 40 that fixes the laminated piezoelectric element 50. The base 40 is made from a barium titanate ceramic and has two laminated piezoelectric elements 50 disposed in row and joined thereto.

The laminated piezoelectric element 50 is obtained by alternately laminating piezoelectric layers 51 of lead zirconium titanate (PZT), each having a thickness of 10 μm to 50 μm, and internal electrode layers 52 composed of silver-palladium (AgPd), each layer having a thickness of several micrometers. The internal electrode layers 52 are connected to the external electrodes 53 at both ends. The laminated piezoelectric element 50 is split in a combtooth manner by half-cut dicing, and each section is used as a drive portion 56 and a support portion 57 (non-drive portion) (see FIG. 7).

The external side of one of two external electrodes 53 is restricted in length by machining such as notching so that it can be split by half-cut dicing, and the sections obtained serve as a plurality of individual electrodes 54. The other side is conductive, without being split by dicing, and serves as a common electrode 55.

An FPC 80 is joined by soldering to individual electrodes 54 of the drive portion. Further, in the common electrode 55, an electrode layer is provided at the end portion of the laminated piezoelectric element 50 and bent to joint to the ground electrode of the FPC 80. A Driver IC (not shown) is mounted on the FPC 80, and drive voltage application to the drive portion 56 is controlled thereby.

The oscillation plate 60 is formed from the thin-film diaphragm portion 62, the island-shaped convex portion (island portion) 61 that is formed in the central zone of the diaphragm portion 62, joined to the laminated piezoelectric element 50 and serves as the drive portion 56, a thick-film portion including a beam for connection to the support portion (not shown), and an opening serving as the ink inflow port 63, by two-layer stacking a Ni plated film obtained by an electroforming method. The thickness of the diaphragm portion is 3 μm and the width is 35 μm (one side).

Joining between the island-shaped convex portion 61 of the oscillation plate 60 and the drive portion 56 of the laminated piezoelectric element 50, and between the oscillation plate 60 and the frame 10 is performed with the patterned adhesive layer 70 including a gap material.

A silicon single-crystal substrate is used for the flow path plate 20, and the plate is patterned by an etching method to form a cavity serving as the fluid resistance portion 21 and pressurized fluid chamber 22 and a through port serving as the link port 23 in a position corresponding to the nozzle 41. A portion remaining after etching serves as a partition wall 24 of the pressurized fluid chamber 22. Further, a portion of decreased etching width is provided in the head, and this portion serves as the fluid resistance portion 21.

The nozzle plate 30 is formed of a metal material, e.g., of a Ni plated film obtained by electroforming and has a large number of nozzles 41 serving as fine discharge ports for inkjet ink droplets. The nozzles 41 are formed to have a horn-like inner (internal) shape (may also have a substantially cylindrical rod-like or barrel-like shape). The diameter of the nozzle 41 is 20 μm to 35 μm, as a diameter on the ink droplet discharge port. The nozzle pitch in each row is 150 dpi.

The ink discharging surface (nozzle surface) of the nozzle plate 30 has an ink repellent layer 71. A water-repellency treated layer according to the properties of ink is formed by a method, such as PTFE-Ni eutectoid plating, electrodeposition of a fluorine resin, vapor deposition coating of an evaporable fluorine resin (such as fluorinated pitch) or application of a solvent of a silicone resin or fluorine resin followed by baking, so as to stabilize the shape of ink droplets and jetting characteristics, thereby obtaining high image quality. In the present invention, in order to keep sufficient ink repellency to an ink containing a fluorine surfactant, the ink repellent layer 71 is composed of a composition containing a silicone resin and/or a fluorine resin. The composition containing a silicone resin and/or a fluorine resin is composed of a silicone resin alone, a fluorine resin alone, and of mixture of a silicone resin and components such as another resin, metal and the like. Examples thereof include a composition in which silicone resin fine particles are dispersed in a fluorine resin, a kneaded product of a silicone resin and polypropylene, and a product obtained by eutectoid plating of a silicone resin and Ni. To prevent elution of a silicone resin, a mixture of a silicone resin and other components other than silicone resins are more effectively used.

In the inkjet head of the above-descried configuration, when a drive waveform (a pulsed voltage of 10 V to 50 V) is applied to the drive portion 56 according to a recording signal, a displacement in the lamination direction is induced in the drive portion 56, the pressurized liquid chamber 22 is pressurized via the oscillation plate 60, the pressure therein is increased, and an ink droplet is discharged from the nozzle 41.

As the discharge of ink droplet is completed, the ink pressure inside the pressurized liquid chamber 22 is reduced, a negative pressure is generated inside the pressurized liquid chamber 22 by the inertia of ink flow and discharge process of the drive pulse, and then a transition is made to an ink filling step. At this time, the ink supplied from the ink tank flows into the common liquid chamber 12, and the pressurized liquid chamber 22 is filled with the ink from the common liquid chamber 12 via the ink inflow port 63 and through the fluid resistance portion 21.

The fluid resistance portion 21 effectively attenuates residual pressure oscillations after discharging and also creates resistance to a refill by surface tension. By appropriately selecting the fluid resistance portion, it is possible to attain a balance between the attenuation of residual pressure and refill, and to shorten time (drive period) to the next ink droplet discharge operation.

(Ink Record)

An ink record according to the present invention is recorded by means of the inkjet recording apparatus and the inkjet recording method of the present invention. The ink record according to the present invention has an image formed on a recording medium using the inkjet ink of the present invention.

The recording medium is not particularly limited and may be appropriately selected according to the purpose. Examples thereof include a regular paper, gloss paper, special paper, fabric, film, and OHP sheet. These recording media may be used alone or in combination.

The ink records have a high image quality with less ink bleed and excel in temporal stability, and thus the ink records may be suitably used for various purposes as documents on which various printing and/or images are recorded.

The present invention can solve the problems in conventional technologies and provide an inkjet ink capable of being prevented from fixation to a nozzle plate having an ink repellent layer containing a silicone resin and excellent in discharge stability, an ink cartridge, inkjet recording method, inkjet recording apparatus, and ink record using the inkjet ink.

EXAMPLES

Hereinafter, Examples of the present invention will be described, which however shall not be construed as limiting the scope of the present invention. All percentages and parts are by mass unless indicated otherwise.

<Preparation of Pigment Dispersion>

The pigments and dispersants shown in Table 3 were respectively mixed with water, and then dispersed for 2 hours using zirconia beads having a diameter of 0.3 μm in DYNO-MILL (by SHINMARU ENTERPRISES CORPORATION). Subsequently, the zirconium beads and liquid were separated to prepare pigment dispersions A to C (pigment concentration of 15% and dispersant concentration of 3.75%).

TABLE 3

| Type | Pigment | Dispersant |
|------|---------|------------|
| A | C.I. Pigment Red 122 (by Dainippon Ink and Chemicals Inc.) | polyoxyethylene (n = 40) β-naphthyl ether |
| B | C.I. Pigment Blue 15:3 (by Toyo Ink Mfg. Co. Ltd.) | sodium polyoxyethylene lauryl sulfate |
| C | C.I.Pigment Yellow 74 (by Dainichiseika Color & Chemicals Mfg. Co., Ltd.) | polyoxyethylene distyryl phenyl ether |

<Self-Dispersible Pigment and Dye>

TABLE 4

| Type | Colorant |
|------|----------|
| D | Self-dispersible pigment (CAB-O-JET300 by CABOT Corporation) |
| E | Dye (C.I. Direct Blue 199) |

* The self-dispersible pigment, CAB-O-JET300 (manufactured by CABOT Corporation) of D is a pigment in which a carbon black surface is modified with a diazonium salt having a —COONa group.

<Resin Emulsion>

TABLE 5

| Type | Resin emulsion |
|------|----------------|
| a | Ether polyurethane resin emulsion (W-5025 by MITSUI CHEMICALS POLYURETHANES, INC.) |
| b | Ether polyurethane resin emulsion (W-5661 by MITSUI CHEMICALS POLYURETHANES, INC.) |
| c | Acryl-silicone resin emulsion (AP4710 by SHOWA HIGHPOLYMER CO., LTD.) |
| d | Styrene-acrylic resin emulsion (JONCRYL 450 by BASF Corporation) |
| e | Fluorine resin emulsion (LUMIFLON FE 4300 by ASAHI GLASS CO., LTD.) |

<Fluorine Surfactant>

α: a fluorine surfactant, FS-300 (manufactured by DuPont) expressed by General Formula (2):

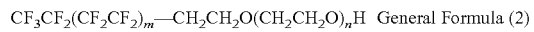

$$CF_3CF_2(CF_2CF_2)_m\text{—}CH_2CH_2O(CH_2CH_2O)_nH \quad \text{General Formula (2)}$$

where m is 6 to 8 and n is 26 or more.

β: a fluorine surfactant, PF-151N (manufactured by OMNOVA Solutions Inc.) expressed by General Formula (3):

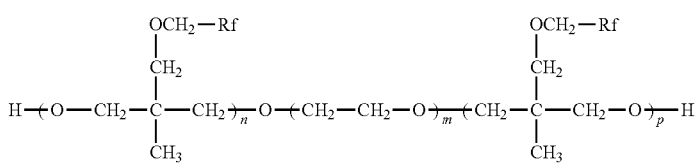

General Formula (3)

where n is 4, m is 21, p is 4 and Rf is $CF_2CF_3$.

γ: a fluorine surfactant, FSN-100 (manufactured by DuPont) expressed by General Formula (2):

General Formula (2)

where m is 1 to 9 and n is 0 to 25.

δ: a fluorine surfactant, PF-156A (manufactured by OMNOVA Solutions Inc.) expressed by General Formula (4):

General Formula (4)

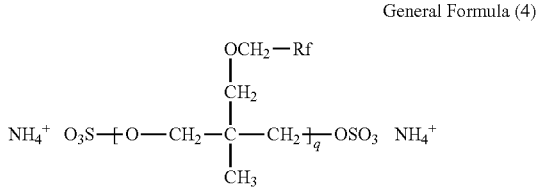

where, q is 6 and Rf is $CF_2CF_3$.

<Silicone Oil>

The silicone oils shown in Table 6 were used. The hydrophobic values of these silicone oils were calculated using Equation 1.

Hydrophobic value=$A/B$        Equation 1 where "A" represents an integration value of a peak area from 0 ppm to 0.3 ppm in a $^1$H-NMR spectrum of the polyether-modified silicone oil using tetramethylsilane (TMS) as a reference substance; and "B" represents an integration value of a peak area from 3.5 ppm to 4.0 ppm in the $^1$H-NMR spectrum.

The $^1$H-NMR measurement was conducted using "JEOL JNM-A400FT NMR SYSTEM" (manufactured by JEOL Ltd.) under the following conditions: sample concentration=1% by mass; solvent: deuterated chloroform ($CDCl_3$); the number of integration=128; and temperature: room temperature. When the sample did not have sufficient solubility, solvents such as DMSO, DMF-d7, THF-d8, acetone-d6, methanol-d4, heavy water and hexane-d14 used in this order. The solvent which firstly dissolved the sample was used.

TABLE 6

| Type | Silicone oil | Hydrophobic value* | HLB (ref.) |
|---|---|---|---|
| R | Polyether-modified silicone oil (SS-2801 by Nippon Unicar Company Limited) | 0.37 | 13 |
| S | Polyether-modified silicone oil (DOW CORNING TORAY FZ-2105 by Dow Corning Toray Co., Ltd.) | 0.38 | 11 |
| T | Polyether-modified silicone oil (SS-2804 by Nippon Unicar Company Limited) | 0.40 | 15 |
| U | Polyether-modified silicone oil (DOW CORNING TORAY L-7604 by Dow Corning Toray Co., Ltd.) | 0.47 | 13 |
| V | Polyether-modified silicone oil (DOW CORNING TORAY FZ-2123 by Dow Corning Toray Co., Ltd.) | 0.98 | 8 |
| W | Polyether-modified silicone oil (KF-353 by Shin-Etsu Chemical Co., Ltd.) | 1.03 | 10 |
| X | Polyether-modified silicone oil (SS-2803 by Nippon Unicar Company Limited) | 1.91 | 6.5 |
| Y | Polyether-modified silicone oil (KF-945 by Shin-Etsu Chemical Co., Ltd.) | 4.23 | 4 |
| Z | Silicone oil by Ricoh Company, Ltd. | infinite | — |

*The hydrophobic value is indicated by rounding off a measured value to two decimal places.

<Preparation of Inkjet Ink>

The ink formulations (100 parts in total) shown in Table 7 were prepared, and then filtrated through a filter having a pore diameter of 0.8 μm to prepare respective inkjet inks. Each ink was subjected to vacuum deaeration and an ink bag for IPSIO GX 3000 (manufactured by Ricoh Company, Ltd.) was filled therewith to prepare an ink cartridge.

TABLE 7

| | Pigment dispersion or dye | Water-soluble organic solvent | Resin emulsion 1 | Resin emulsion 2 | Surfactant | Silicone oil | Water |
|---|---|---|---|---|---|---|---|
| Ink 1 | A (40.0 parts) | diethylene glycol (20.0 parts) glycerin (10.0 parts) | b (2.0 parts) | c (5.0 parts) | α (2.0 parts) | U (1.0 part) | q.s. |
| Ink 2 | A (40.0 parts) | diethylene glycol (20.0 parts) glycerin (10.0 parts) | b (2.0 parts) | d (5.0 parts) | α (2.0 parts) | U (1.0 part) | q.s. |
| Ink 3 | B (30.0 parts) | glycerin (10.0 parts) | b (5.0 parts) | — | β (1.0 part) | W (1.0 part) | q.s. |
| Ink 4 | B (30.0 parts) | glycerin (10.0 parts) | b (5.0 parts) | — | β (1.0 part) | W (0.5 parts) | q.s. |
| Ink 5 | B (30.0 parts) | glycerin (10.0 parts) | b (2.0 parts) | e (3.0 parts) | β (1.0 part) | W (0.5 parts) | q.s. |
| Ink 6 | C (33.3 parts) | glycerin (10.0 parts) | a (5.0 parts) | — | γ (1.0 part) | U (1.0 part) | q.s. |
| Ink 7 | C (33.3 parts) | glycerin (10.0 parts) | a (5.0 parts) | — | δ (1.0 part) | U (1.0 part) | q.s. |
| Ink 8 | C (33.3 parts) | glycerin (10.0 parts) | a (5.0 parts) | — | α (1.0 part) | V (1.0 part) | q.s. |
| Ink 9 | A (40.0 parts) | glycerin (10.0 parts) | b (5.0 parts) | — | β (0.5 parts) | T (0.5 parts) | q.s. |
| Ink 10 | D (50.0 parts) | glycerin (10.0 parts) | — | c (5.0 parts) | α (1.0 part) | U (1.0 part) | q.s. |
| Ink 11 | E (4.0 parts) | glycerin (10.0 parts) | — | c (5.0 parts) | β (1.0 part) | W (1.0 part) | q.s. |

TABLE 7-continued

|  | Pigment dispersion or dye | Water-soluble organic solvent | Resin emulsion 1 | Resin emulsion 2 | Surfactant | Silicone oil | Water |
|---|---|---|---|---|---|---|---|
| Comparative Ink 1 | A (40.0 parts) | diethylene glycol (20.0 parts) glycerin (10.0 parts) | b (2.0 parts) | c (5.0 parts) | α (2.0 parts) | — | q.s. |
| Comparative Ink 2 | A (40.0 parts) | diethylene glycol (20.0 parts) glycerin (10.0 parts) | b (2.0 parts) | c (5.0 parts) | α (2.0 parts) | S (1.0 part) | q.s. |
| Comparative Ink 3 | A (40.0 parts) | diethylene glycol (20.0 parts) glycerin (10.0 parts) | b (2.0 parts) | c (5.0 parts) | α (2.0 parts) | Y (1.0 part) | q.s. |
| Comparative Ink 4 | A (40.0 parts) | diethylene glycol (20.0 parts) glycerin (10.0 parts) | b (2.0 parts) | c (5.0 parts) | α (2.0 parts) | Z (1.0 part) | q.s. |
| Comparative Ink 5 | A (40.0 parts) | glycerin (10.0 parts) | b (5.0 parts) | — | β (0.5 parts) | X (0.5 parts) | q.s. |
| Comparative Ink 6 | B (30.0 parts) | glycerin (10.0 parts) | a (5.0 parts) | — | β (0.5 parts) | R (0.5 parts) | q.s. |
| Comparative Ink 7 | C (33.3 parts) | glycerin (10.0 parts) | a (5.0 parts) | — | δ (1.0 part) | S (2.0 parts) | q.s. |
| Comparative Ink 8 | D (50.0 parts) | glycerin (10.0 parts) | b (2.0 parts) | — | α (2.0 parts) | — | q.s. |
| Comparative Ink 9 | E (4.0 parts) | glycerin (10.0 parts) | b (2.0 parts) | — | α (2.0 parts) | — | q.s. |

The surface tensions of the prepared inkjet inks were respectively measured under the following conditions. The results are shown in Table 8.

<Measurement of Surface Tension>

The surface tension was measured at 25° C. using a surface tensionometer (CBVP-Z by Kyowa Interface Science Co., Ltd.).

TABLE 8

| Ink | Surface tension (mN/m) |
|---|---|
| Ink 1 | 24.7 |
| Ink 2 | 24.6 |
| Ink 3 | 25.0 |
| Ink 4 | 25.4 |
| Ink 5 | 25.3 |
| Ink 6 | 25.8 |
| Ink 7 | 25.1 |
| Ink 8 | 24.0 |
| Ink 9 | 24.8 |
| Ink 10 | 24.9 |
| Ink 11 | 25.4 |
| Comparative Ink 1 | 25.2 |
| Comparative Ink 2 | 24.1 |
| Comparative Ink 3 | 23.8 |
| Comparative Ink 4 | 25.0 |
| Comparative Ink 5 | 24.6 |
| Comparative Ink 6 | 25.2 |
| Comparative Ink 7 | 25.3 |
| Comparative Ink 8 | 24.4 |
| Comparative Ink 9 | 25.3 |

Production Example 1

Production of Nozzle Plate 1

A silicone resin, SR2411 (by Dow Corning Toray Co., Ltd.) was coated on a surface of an electroformed Ni nozzle by a dispenser to form a silicone layer. The silicone layer was formed in such a manner that firstly nozzle holes and the back surface of a nozzle plate were masked with a water soluble resin, and the mask was removed therefrom. This was left to stand for 2 days at room temperature so as to cure, thereby forming an ink repellent layer having a thickness of 1.2 μm. The obtained ink repellent layer had a surface roughness Ra of 0.18 μm and a critical surface tension of 21.6 mN/m.

The thickness of the ink repellent layer was measured using a spectrometric film thickness measurement system, LAMBDA-ACE VM-8000J (manufactured by DAINIPPON SCREEN MFG Co., Ltd.).

The surface roughness of the ink repellent layer was measured using a stylus profiler for surface roughness measurement, Dektak3-ST (by Veeco Instruments).

The critical surface tension of the ink repellent layer was measured by Zisman method.

Production Example 2

Production of Nozzle Plate 2

An ink repellent layer having a thickness of 1.0 μm formed on a nozzle plate was produced in the same manner as in Production Example 1, except that the silicone resin, SR2411 (by Dow Corning Toray Co., Ltd.) in Production Example 1 was changed to a silicone resin, KBM7803 (Shin-Etsu Chemical Co., Ltd.). The ink repellent layer was measured in the same manner as in Production Example 1, and had a surface roughness Ra of 0.22 μm and a critical surface tension of 0.17 mN/m.

Production Example 3

Production of Nozzle Plate 3

On a polyimide film, Kapton (manufactured by DuPont Electronics, without addition of particles), an $SiO_2$ film having a thickness of 10 Å (1 nm) was formed by sputtering, and then an ink repellent layer made of a mixture of a modified perfluoropolyoxethane OPTOOL DSX (manufactured by Daikin Industries, Ltd.) having a thickness of 30 Å (3 nm) was formed by vacuum evaporation. Next, a nozzle hole was formed by an excimer laser process from the ink repellent layer side, thereby producing a nozzle plate.

The thickness of the ink repellent layer was measured on an atomic force microscope, NaNO—I (manufactured by TOYO Corporation). The surface roughness Ra and critical surface tension of the ink repellent layer were respectively 0.01 μm and 11.8 mN/m by measuring in the same manner as in Production Example 1.

Comparative Production Example 1

Production of Nozzle Plate 4

A nozzle plate was produced in the same manner as in Production Example 1, except that the ink repellent layer consisting of a silicone resin was not formed on the surface of the electroformed Ni nozzle.

Example 1

An ink head was produced using the nozzle plate 1 and mounted in an inkjet printer IPSIO GX3000 (manufactured by Ricoh Company, Ltd.), and then an ink cartridge filled with Ink 1 was mounted in the inkjet printer and the discharge stability was evaluated in the following manner. The results are shown in Table 9.

<Evaluation of Discharge Stability>

The printer was placed in a constant temperature and humidity room, the temperature of the inside was adjusted at 32° C. and 30% RH. The following pattern chart was continuously printed on 20 sheets and then not printed (in a resting state) for 20 minutes. This process was repeated 50 times and 1,000 sheets were printed in total, and then the nozzle plate was observed on a microscope and evaluated on the presence or absence of fixation.

—Pattern Chart—

A pattern was printed using a chart having a print area of each color of 5% in whole area of a sheet surface with 100% duty of each color ink under the printing conditions of a recording density of 300 dpi and one pass printing.

[Evaluation Criteria]

A: No fixation was found near the nozzle.
B: Fixation was found near the nozzle.

Examples 2 to 11 and Comparative Examples 1 to 10

Images of Examples 2 to 11 and Comparative Examples 1 to 10 were printed in the same manner as in Example 1, except that the inkjet printer respectively using the combinations of the inks and nozzle plates shown in Table 9 was used. And then, the discharge stability was evaluated in the same manner as in Example 1. The results are shown in Table 9.

TABLE 9

|  | Ink | Nozzle plate | Discharge stability (fixation state) |
|---|---|---|---|
| Example 1 | Ink 1 | 1 | A |
| Example 2 | Ink 2 | 1 | A |
| Example 3 | Ink 3 | 1 | A |
| Example 4 | Ink 4 | 2 | A |
| Example 5 | Ink 5 | 2 | A |
| Example 6 | Ink 6 | 2 | A |
| Example 7 | Ink 7 | 3 | A |
| Example 8 | Ink 8 | 3 | A |
| Example 9 | Ink 9 | 3 | A |
| Example 10 | Ink 10 | 1 | A |
| Example 11 | Ink 11 | 1 | A |
| Comparative Example 1 | Comparative Ink 1 | 1 | B |
| Comparative Example 2 | Comparative Ink 2 | 1 | B |
| Comparative Example 3 | Comparative Ink 3 | 1 | B |
| Comparative Example 4 | Comparative Ink 4 | 2 | B |
| Comparative Example 5 | Comparative Ink 5 | 2 | B |
| Comparative Example 6 | Comparative Ink 6 | 2 | B |
| Comparative Example 7 | Comparative Ink 7 | 3 | B |
| Comparative Example 8 | Comparative Ink 8 | 3 | B |
| Comparative Example 9 | Comparative Ink 9 | 3 | B |
| Comparative Example 10 | Ink 1 | 4 | B |

The inkjet ink of the present invention can be prevented from fixation to an ink repellent layer and excellent in discharge stability, thereby suitably used for an inkjet recording method and an inkjet recording apparatus.

The inkjet recording apparatus and inkjet recording method of the present invention can be applied to various recording systems by the inkjet recording method, and can be particularly advantageously applied to inkjet recording printers, facsimile machines, copiers, and printer-fax-copier machines.

What is claimed is:

1. An inkjet recording method comprising:
   jetting an inkjet ink from an inkjetting unit so as to record an image on a recording medium by applying a stimulus to the inkjet ink,
   wherein the inkjetting unit comprises a recording head whose surface provided with an opening for ink discharge has an ink repellent layer, and
   wherein the inkjet ink comprises:
   a colorant,
   water,
   a water insoluble resin,
   a fluorine surfactant, and
   a polyether-modified silicone oil,
   wherein the polyether-modified silicone oil has a hydrophobic value of 0.40 to 1.5, and the hydrophobic value is expressed by Equation 1:

$$\text{Hydrophobic value} = A/B \qquad \text{Equation 1}$$

where "A" represents an integration value of a peak area from 0 ppm to 0.3 ppm in a $^1$H-NMR spectrum of the polyether-modified silicone oil using tetramethylsilane as a reference substance; and "B" represents an integration value of a peak area from 3.5 ppm to 4.0 ppm in the $^1$H-NMR spectrum.

2. The inkjet recording method according to claim 1, wherein the ink repellent layer is composed of any one of a fluorine material and silicone material.

3. The inkjet recording method according to claim 1, wherein the ink repellent layer has a surface roughness Ra of 0.2 μm or less.

4. The inkjet recording method according to claim 1, wherein the ink repellent layer is so formed that a cross section area in a plane perpendicular to a central line of an opening of the ink repellant layer, which is formed on the surface provided with the opening for ink discharge in the recording head, in the vicinity of the opening increases successively with distance from the surface of the base material.

5. The inkjet recording method according to claim 1, wherein the ink repellent layer has a critical surface tension of 5 mN/m to 40 mN/m.

6. An inkjet recording apparatus comprising:
   an inkjetting unit configured to jet an inkjet ink so as to record an image on a recording medium by applying a stimulus to the inkjet ink,
   wherein the stimulus is at least one selected from heat, pressure, vibration and light, and
   wherein the inkjet ink comprises:
   a colorant,
   water,
   a water insoluble resin,
   a fluorine surfactant, and
   a polyether-modified silicone oil, wherein the polyether-modified silicone oil has a hydrophobic value of 0.40 to 1.5, and the hydrophobic value is expressed by Equation 1:

$$\text{Hydrophobic value} = A/B \qquad \text{Equation 1}$$

where "A" represents an integration value of a peak area from 0 ppm to 0.3 ppm in a $^1$H-NMR spectrum of the polyether-modified silicone oil using tetramethylsilane as a reference substance; and "B" represents an integration value of a peak area from 3.5 ppm to 4.0 ppm in the $^1$H-NMR spectrum.

* * * * *